(12) United States Patent
Xue et al.

(10) Patent No.: US 12,556,326 B2
(45) Date of Patent: Feb. 17, 2026

(54) COMMUNICATIONS METHOD, APPARATUS, AND SYSTEM

(71) Applicant: Huawei Technologies Co., Ltd., Shenzhen (CN)

(72) Inventors: Yifan Xue, Beijing (CN); Kuandong Gao, Chengdu (CN); Yedan Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/800,105

(22) PCT Filed: Jan. 13, 2021

(86) PCT No.: PCT/CN2021/071468
§ 371 (c)(1),
(2) Date: Aug. 16, 2022

(87) PCT Pub. No.: WO2021/164473
PCT Pub. Date: Aug. 26, 2021

(65) Prior Publication Data
US 2023/0100896 A1 Mar. 30, 2023

(30) Foreign Application Priority Data
Feb. 17, 2020 (CN) .......................... 202010097211.7

(51) Int. Cl.
*H04W 72/30* (2023.01)
*H04L 5/00* (2006.01)
*H04W 72/23* (2023.01)

(52) U.S. Cl.
CPC .......... *H04L 5/0048* (2013.01); *H04L 5/0094* (2013.01); *H04W 72/30* (2023.01); *H04W 72/23* (2023.01)

(58) Field of Classification Search
CPC ..... H04L 5/0048; H04L 5/0094; H04L 5/005; H04W 72/30; H04W 72/23; H04W 4/06
See application file for complete search history.

(56) References Cited

U.S. PATENT DOCUMENTS 8,792,399 B2 7/2014 Muruganathan et al.
9,049,674 B2 6/2015 Zhang et al.
(Continued)

FOREIGN PATENT DOCUMENTS

CN 102377464 A 3/2012
CN 103841632 A 6/2014
(Continued)

OTHER PUBLICATIONS

"3rd Generation Partnership Project; Technical Specification Group Radio Access Network; NR; Radio Resource Control (RRC); Protocol specification, (Release 15)," 3GPP TS 38.331 V0.1.0 (Oct. 2017), Technical Specification, 42 pages.
(Continued)

*Primary Examiner* — Lakeram Jangbahadur
(74) *Attorney, Agent, or Firm* — Slater Matsil, LLP

(57) ABSTRACT

A communications method includes a terminal device receives broadcast information sent by a network device, where the broadcast information includes first information indicating N configuration parameters and a plurality of pieces of second information indicating $M_i$ configuration parameters. Then, the terminal device determines configuration information of an $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters, and $Q_i$ is greater than or equal to
(Continued)

N, and $Q_i$ is greater than or equal to $M_i$. The method reduces signaling overheads of the broadcast information.

20 Claims, 7 Drawing Sheets

(56) References Cited

U.S. PATENT DOCUMENTS

| | | |
|---|---|---|
| 11,239,970 B2 | 2/2022 | Xia et al. |
| 11,374,716 B2 | 6/2022 | Guan et al. |
| 2013/0301548 A1 | 11/2013 | Etemad et al. |
| 2015/0043368 A1 | 2/2015 | Kim et al. |
| 2017/0245165 A1* | 8/2017 | Onggosanusi ........ H04W 24/08 |
| 2020/0177336 A1* | 6/2020 | Li ..................... H04W 72/54 |

FOREIGN PATENT DOCUMENTS

| | | | |
|---|---|---|---|
| CN | 104620531 A | 5/2015 | |
| CN | 108111275 A | 6/2018 | |
| CN | 109150387 A | 1/2019 | |
| CN | 109391432 A | 2/2019 | |
| CN | 109802818 A | 5/2019 | |
| EP | 3562078 A1 | 10/2019 | |
| EP | 3698509 B1 * | 10/2023 | ............. H04L 27/14 |
| WO | 2018028703 A1 | 2/2018 | |
| WO | 2018053255 A1 | 3/2018 | |
| WO | WO-2019029488 A1 * | 2/2019 | ............. H04L 5/00 |
| WO | 2020013929 A1 | 1/2020 | |

OTHER PUBLICATIONS

"3rd Generation Partnership Project; Technical Specification Group Radio Access Network; NR; Physical layer procedures for control, (Release 15)," 3GPP TS 38.213 V1.0.0 (Sep. 2017), 16 pages.

"3rd Generation Partnership Project; Technical Specification Group Radio Access Network; NR; Physical layer procedures for data, (Release 15)," 3GPP TS 38.214 V1.0.0 (Sep. 2017), 32 pages.

"3rd Generation Partnership Project; Technical Specification Group Radio Access Network; NR; Physical channels and modulation, (Release 15)," 3GPP TS 38.211 V1.0.0 (Sep. 2017), Technical Specification, 37 pages.

Moderator (Samsung), "Moderator Summary #1 for TRS/CSI occasion(s) for idle/inactive UEs," 3GPP TSG RAN WG1 #106e, R1-2109502, e-Meeting, Oct. 11 -19, 2021, 35 pages.

Moderator (Samsung), "Moderator summary #1 on TRS/CSI-RS occasion(s) for idle/inactive UEs," 3GPP TSG RAN WG1 #107-bis, R1-2200203, e-Meeting, Jan. 17-25, 2021, 32 pages.

"Discussion on NR RRM measurement based on CSI-RS for L3 mobility," Source: NTT Docomo, Inc., Agenda Item: 5.1.1.5.2, Document for: Discussion and Decision, 3GPP TSG RAN WG1 NR Ad-Hoc#2, R1-1711070, Qingdao, P.R. China, Jun. 27-30, 2017, 7 pages.

"Assistance RS occasions for IDLE/inactive mode," Agenda Item: 8.7.1.2, Source: Huawei, HiSilicon, Document for: Discussion and Decision, 3GPP TSG RAN WG1 Meeting #102-e, R1-2005263, E-meeting, Aug. 17-28, 2020, 5 pages.

* cited by examiner

COMMUNICATIONS METHOD, APPARATUS, AND SYSTEM

CROSS-REFERENCE TO RELATED APPLICATIONS

This application is a National Stage of International Application No. PCT/CN2021/071468, filed on Jan. 13, 2021, which claims priority to Chinese Patent Application No. 202010097211.7, filed on Feb. 17, 2020. Both of the aforementioned applications are hereby incorporated by reference in their entireties.

TECHNICAL FIELD

Embodiments of this application relate to the field of communications technologies, and in particular, to a communications method, apparatus, and system.

BACKGROUND

In a 5G communications system, a reference signal (reference signal, RS) may be used for a plurality of purposes, for example, used by user equipment (user equipment, UE) to perform automatic gain control (Automatic Gain Control, AGC) adjustment, time-frequency synchronization, beam measurement, and radio resource management (Radio Resource Management, RRM) measurement. To reduce network resource overheads, introduction of excessive cell-level reference signals is avoided at the beginning of design, and a finally determined cell-level reference signal is sent in a synchronization signal block (synchronization signal block, SSB). The SSB is periodically sent, and is sent in some slots (a slot in NR is a basic scheduling unit, and a length of the slot is related to a subcarrier spacing). For example, when the subcarrier spacing is 15 kHz, a length of one slot is 1 ms. In this case, a possible configuration is shown in FIG. 1. Four SSBs are sent within 2 ms, but four SSBs in a next periodicity are sent only after 20 ms.

If UE is in an inactive (INACTIVE) state or an idle (IDLE) state, the UE receives, on a paging occasion (paging occasion, PO), paging (paging) sent by a network side, and the UE needs to receive paging downlink control information (downlink control information, DCI) before receiving the paging. In addition, before receiving the paging DCI, the UE needs to perform operations such as AGC adjustment and time-frequency synchronization in advance, to ensure that receiving performance of the paging DCI is high enough. As described above, a reference signal needs to be used for these operations.

Currently, configuration information of a reference signal may be sent to UE by using a broadcast message. Configuration information of each reference signal occupies a large quantity of bits, and one broadcast message includes a limited amount of configuration information of reference signals. Consequently, a requirement of sending configuration information of more reference signals cannot be met.

SUMMARY

Embodiments of this application provide a communications method, apparatus, and system, to reduce signaling overheads of broadcast information, so as to meet a requirement of sending configuration information of more reference signals.

According to a first aspect, an embodiment of this application provides a communications method, including: A terminal device first receives broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal. Then, the terminal device determines configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to a sum of N and $M_i$. That the terminal device determines configuration information of the $i^{th}$ reference signal based on all of the configuration parameters indicated by the first information and the $M_i$ configuration parameters indicated by the $i^{th}$ piece of second information may be as follows: The terminal device determines the N configuration parameters in the $Q_i$ configuration parameters based on the first information, and determines the remaining $M_i$ configuration parameters in the $Q_i$ configuration parameters based on the $i^{th}$ piece of second information.

In a possible implementation, the $i^{th}$ piece of second information includes the $M_i$ configuration parameters.

In a possible implementation, the $Q_i$ configuration parameters include the N configuration parameters.

In a possible implementation, $Q_i$ is equal to N, and the N configuration parameters in the first information and the $M_i$ configuration parameters include configuration parameters with a same parameter name.

In a possible implementation, that the terminal device obtains configuration information of the $i^{th}$ reference signal based on some or all of the configuration parameters indicated by the first information and the $M_i$ configuration parameters indicated by the $i^{th}$ piece of second information may be as follows: The terminal device determines the $M_i$ configuration parameters in the $Q_i$ configuration parameters based on the $i^{th}$ piece of second information. Then, the terminal device determines a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters.

In a possible implementation, the $i^{th}$ piece of second information includes the $M_i$ configuration parameters.

In a possible implementation, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

In a possible implementation, that the terminal device determines the $M_i$ configuration parameters in the $Q_i$ configuration parameters based on the $i^{th}$ piece of second information may be as follows: The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

In a possible implementation, the terminal device further determines configuration information of a $(K+1)^{th}$ reference signal based on the first information.

In a possible implementation, the configuration information of the $(K+1)^{th}$ reference signal includes the N configuration parameters.

According to a second aspect, an embodiment of this application provides a communications method, including the following steps:

A network device first generates broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and then sends the broadcast information through broadcast.

Configuration information of the $i^{th}$ reference signal is related to some or all of the configuration parameters indicated by the first information and the $M_i$ configuration parameters indicated by the $i^{th}$ piece of second information, and the configuration information of the $i^{th}$ reference signal includes $Q_i$ configuration parameters. N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to a sum of N and $M_i$. The N configuration parameters in the $Q_i$ configuration parameters are related to the first information, and the remaining $M_i$ configuration parameters in the $Q_i$ configuration parameters are related to the i pieces of second information.

In a possible implementation, the $i^{th}$ piece of second information includes the $M_i$ configuration parameters.

In a possible implementation, the $Q_i$ configuration parameters include the N configuration parameters.

In a possible implementation, $Q_i$ is equal to N, and the N configuration parameters in the first information and the $M_i$ configuration parameters include configuration parameters with a same parameter name.

In a possible implementation, the $M_i$ configuration parameters in the $Q_i$ configuration parameters are related to the $i^{th}$ piece of second information, and a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

In a possible implementation, the $i^{th}$ piece of second information includes the $M_i$ configuration parameters.

In a possible implementation, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

In a possible implementation, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

In a possible implementation, the first information is used to determine configuration information of a $(K+1)^{th}$ reference signal.

In a possible implementation, the configuration information of the $(K+1)^{th}$ reference signal includes the N configuration parameters.

According to a third aspect, an embodiment of this application provides a communications method, including: A terminal device first receives broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal. When i is equal to 1, the terminal device determines configuration information of the $i^{th}$ reference signal based on some or all of the configuration parameters indicated by the first information and the $M_i$ configuration parameters indicated by the $i^{th}$ piece of second information. When i is not equal to 1, the terminal device determines configuration information of the $i^{th}$ reference signal based on configuration information of an $(i-1)^{th}$ reference signal and the $M_i$ configuration parameters indicated by the $i^{th}$ piece of second information. The configuration information of the $i^{th}$ reference signal includes $Q_i$ configuration parameters. N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to N. When i is equal to 1, the N configuration parameters in the first information and the $M_i$ configuration parameters include configuration parameters with a same parameter name. When i is not equal to 1, $Q_{i-1}$ configuration parameters of the $(i-1)^{th}$ reference signal and the $M_i$ configuration parameters include configuration parameters with a same parameter name.

In a possible implementation, that the terminal device determines configuration information of the $i^{th}$ reference signal based on some or all of the configuration parameters indicated by the first information and the $M_i$ configuration parameters indicated by the $i^{th}$ piece of second information may be as follows: The terminal device determines the $M_i$ configuration parameters in the $Q_i$ configuration parameters based on the $i^{th}$ piece of second information; and then determines a configuration parameter other than the $M_i$ configuration parameters in the $Q_i$ configuration parameters based on a configuration parameter other than a configuration parameter whose parameter name is the same as any of parameter names of the $M_i$ configuration parameters in the $N^{th}$ configuration parameter. Then, that the terminal device determines configuration information of the $i^{th}$ reference signal based on configuration information of an $(i-1)^{th}$ reference signal and the $M_i$ configuration parameters indicated by the $i^{th}$ piece of second information includes the following steps:

The terminal device determines the $M_i$ configuration parameters in the $Q_i$ configuration parameters based on the $i^{th}$ piece of second information.

The terminal device determines a configuration parameter other than the $M_i$ configuration parameters in the $Q_i$ configuration parameters based on a configuration parameter other than a configuration parameter whose parameter name is the same as any of parameter names of the $M_i$ configuration parameters in the $Q_{i-1}$ configuration parameters of the $(i-1)^{th}$ reference signal.

In a possible implementation, the $i^{th}$ piece of second information includes the $M_i$ configuration parameters.

In a possible implementation, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_i$ configuration parameters of the $(i-1)^{th}$ reference signal, and the second parameter name is any one of same parameter names of configuration parameters in the $Q_i$ configuration parameters of the $(i-1)^{th}$ reference signal and the $M_i$ configuration parameters.

In a possible implementation, when i is equal to 1, that the terminal device determines the $M_i$ configuration parameters in the $Q_i$ configuration parameters based on the $i^{th}$ piece of second information includes the following step:

The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

When i is not equal to 1, that the terminal device determines the $M_i$ configuration parameters in the $Q_i$ configuration parameters based on the $i^{th}$ piece of second information includes the following step:

The terminal device determines a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

In a possible implementation, the terminal device further determines configuration information of a $(K+1)^{th}$ reference signal based on the first information.

In a possible implementation, the configuration information of the $(K+1)^{th}$ reference signal includes the N configuration parameters.

According to a fourth aspect, an embodiment of this application provides a communications method, including:
A network device first generates broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and then sends the broadcast information through broadcast.

When i is equal to 1, configuration information of the $i^{th}$ reference signal is related to some or all of the configuration parameters indicated by the first information and the $M_i$ configuration parameters indicated by the $i^{th}$ piece of second information. When i is not equal to 1, configuration information of the $i^{th}$ reference signal is related to configuration information of an $(i-1)^{th}$ reference signal and the $M_i$ configuration parameters indicated by the $i^{th}$ piece of second information. The configuration information of the $i^{th}$ reference signal includes $Q_i$ configuration parameters. N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to N. When i is equal to 1, the N configuration parameters in the first information and the $M_i$ configuration parameters include configuration parameters with a same parameter name. When i is not equal to 1, $Q_{i-1}$ configuration parameters of the $(i-1)^{th}$ reference signal and the $M_i$ configuration parameters include configuration parameters with a same parameter name.

In a possible implementation, the $M_i$ configuration parameters in the $Q_i$ configuration parameters are related to the $i^{th}$ piece of second information. When i is equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters. When i is not equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the $Q_{i-1}$ configuration parameters of the $(i-1)^{th}$ reference signal.

In a possible implementation, the $i^{th}$ piece of second information includes the $M_i$ configuration parameters.

In a possible implementation, the $i^{th}$ piece of second information includes offsets of the $M_i$ configuration parameters. When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters. When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

In a possible implementation, when i is equal to 1, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters. When i is not equal to 1, a configuration parameter with the second parameter name that is of the $i^{th}$ reference signal is related to the offset of the configuration parameter with the second parameter name in the $i^{th}$ piece of second information and the configuration parameter with the second parameter name in the $Q_{i-1}$ configuration parameters of the $(i-1)^{th}$ reference signal.

In a possible implementation, the first information is used to determine configuration information of a $(K+1)^{th}$ reference signal.

In a possible implementation, the configuration information of the $(K+1)^{th}$ reference signal includes the N configuration parameters.

According to a fifth aspect, an embodiment of this application provides a communications method, including: A terminal device first receives broadcast information sent by a network device, where the broadcast information includes K pieces of identification information, the K pieces of identification information respectively correspond to configuration information of K reference signals, and K is an integer greater than or equal to 1; and then determines the configuration information of the K reference signals that respectively corresponds to the K pieces of identification information.

In a possible implementation, that the terminal device determines the configuration information of the K reference signals that respectively corresponds to the K pieces of identification information may be as follows: The terminal device determines, based on a preset correspondence between identification information and configuration information of a reference signal, the configuration information of the K reference signals that respectively corresponds to the K pieces of identification information.

According to a sixth aspect, an embodiment of this application provides a communications method, including: A network device first generates broadcast information, where the broadcast information includes identification information of configuration information of all of K reference signals; and then sends the broadcast information through broadcast.

In a possible implementation, there is a preset correspondence between configuration information of a reference signal and identification information.

According to a seventh aspect, an embodiment of this application provides a communications apparatus, including a receiving module and a processing module.

The receiving module is configured to receive broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The processing module is configured to determine configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to a sum of N and M.

The processing module is specifically configured to: determine the N configuration parameters in the $Q_i$ configuration parameters based on the first information, and determine the remaining $M_i$ configuration parameters in the $Q_i$ configuration parameters based on the $i^{th}$ piece of second information.

In a possible implementation, the $i^{th}$ piece of second information includes the $M_i$ configuration parameters.

In a possible implementation, the $Q_i$ configuration parameters include the N configuration parameters.

In a possible implementation, $Q_i$ is equal to N, and the N configuration parameters in the first information and the $M_i$ configuration parameters include configuration parameters with a same parameter name.

In a possible implementation, the processing module is specifically configured to:

determine the $M_i$ configuration parameters in the $Q_i$ configuration parameters based on the $i^{th}$ piece of second information; and determine a configuration parameter other than the $M_i$ configuration parameters in the $Q_i$, configuration parameters based on a configuration parameter other than a configuration parameter whose parameter name is the same as any of parameter names of the $M_i$ configuration parameters in the N configuration parameters.

In a possible implementation, the $i^{th}$ piece of second information includes the $M_i$ configuration parameters.

In a possible implementation, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

In a possible implementation, the processing module is specifically configured to determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

In a possible implementation, the processing module is further configured to determine configuration information of a $(K+1)^{th}$ reference signal based on the first information.

In a possible implementation, the configuration information of the $(K+1)^{th}$ reference signal includes the N configuration parameters.

According to an eighth aspect, an embodiment of this application provides a communications apparatus, including a processing module and a sending module.

The processing module is configured to generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The sending module is configured to send the broadcast information through broadcast.

Configuration information of the $i^{th}$ reference signal is related to some or all of the configuration parameters indicated by the first information and the $M_i$ configuration parameters indicated by the $i^{th}$ piece of second information, and the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to a sum of N and $M_i$.

The N configuration parameters in the $Q_i$ configuration parameters are related to the first information, and the remaining $M_i$ configuration parameters in the $Q_i$ configuration parameters are related to the i pieces of second information.

In a possible implementation, the $i^{th}$ piece of second information includes the $M_i$ configuration parameters.

In a possible implementation, the $Q_i$ configuration parameters include the N configuration parameters.

In a possible implementation, $Q_i$ is equal to N, and the N configuration parameters in the first information and the $M_i$ configuration parameters include configuration parameters with a same parameter name.

In a possible implementation, the $M_i$ configuration parameters in the $Q_i$ configuration parameters are related to the $i^{th}$ piece of second information, and a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

In a possible implementation, the $i^{th}$ piece of second information includes the $M_i$ configuration parameters.

In a possible implementation, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

In a possible implementation, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

In a possible implementation, the first information is used to determine configuration information of a $(K+1)^{th}$ reference signal.

In a possible implementation, the configuration information of the $(K+1)^{th}$ reference signal includes the N configuration parameters.

According to a ninth aspect, an embodiment of this application provides a communications apparatus, including a receiving module and a processing module.

The receiving module is configured to receive broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The processing module is configured to: when i is equal to 1, determine configuration information of the $i^{th}$ reference signal based on some or all of the configuration parameters indicated by the first information and the $M_i$ configuration parameters indicated by the $i^{th}$ piece of second information; or when i is not equal to 1, determine configuration information of the $i^{th}$ reference signal based on configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters. N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to N. When i is equal to 1, the N configuration parameters in the first information and the $M_i$ configuration parameters include configuration parameters with a same parameter name. When i is not equal to 1, $Q_{i-1}$ configuration parameters of the $(i-1)^{th}$ reference signal and the $M_i$ configuration parameters include configuration parameters with a same parameter name.

In a possible implementation, the processing module is specifically configured to:

when i is equal to 1, determine the $M_i$ configuration parameters in the $Q_i$ configuration parameters based on the $i^{th}$ piece of second information; and determine a configuration parameter other than the $M_i$ configuration parameters in the $Q_i$ configuration parameters based on a configuration parameter other than a configuration parameter whose parameter name is the same as any of parameter names of the $M_i$ configuration parameters in the $N^{th}$ configuration parameter; or when i is not equal to 1, determine the $M_i$ configuration parameters in the $Q_i$ configuration parameters based on the $i^{th}$ piece of second information; and determine a configuration parameter other than the $M_i$ configuration parameters in the $Q_i$ configuration parameters based on a configuration parameter other than a configuration parameter whose parameter name is the same as any of parameter names of the $M_i$ configuration parameters in the configuration parameters of the $(i-1)^{th}$ reference signal.

In a possible implementation, the $i^{th}$ piece of second information includes the $M_i$, configuration parameters.

In a possible implementation, the $i^{th}$ piece of second information includes offsets of the $M_i$ configuration parameters. When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

In a possible implementation, the processing module is specifically configured to:

when i is equal to 1, determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters; or when i is not equal to 1, determine a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

In a possible implementation, the processing module is further configured to determine configuration information of a $(K+1)^{th}$ reference signal based on the first information.

In a possible implementation, the configuration information of the $(K+1)^{th}$ reference signal includes the N configuration parameters.

According to a tenth aspect, an embodiment of this application provides a communications apparatus, including a processing module and a sending module.

The processing module is configured to generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The sending module is configured to send the broadcast information through broadcast.

When i is equal to 1, configuration information of the $i^{th}$ reference signal is related to some or all of the configuration parameters indicated by the first information and the $M_i$ configuration parameters indicated by the $i^{th}$ piece of second information.

When i is not equal to 1, configuration information of the $i^{th}$ reference signal is related to configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters. N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

In a possible implementation, $Q_i$ is equal to N.

When i is equal to 1, the N configuration parameters in the first information and the $M_i$ configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

In a possible implementation, the $M_i$ configuration parameters in the $Q_i$ configuration parameters are related to the $i^{th}$ piece of second information.

When i is equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

When i is not equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the $Q_{i-1}$ configuration parameters of the $(i-1)^{th}$ reference signal.

In a possible implementation, the $i^{th}$ piece of second information includes the $M_i$ configuration parameters.

In a possible implementation, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

In a possible implementation, when i is equal to 1, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

When i is not equal to 1, a configuration parameter with the second parameter name that is of the $i^{th}$ reference signal is related to the offset of the configuration parameter with the second parameter name in the $i^{th}$ piece of second information and the configuration parameter with the second parameter name in the $Q_{i-1}$ configuration parameters of the $(i-1)^{th}$ reference signal.

In a possible implementation, the first information is used to determine configuration information of a $(K+1)^{th}$ reference signal.

In a possible implementation, the configuration information of the $(K+1)^{th}$ reference signal includes the N configuration parameters.

According to an eleventh aspect, an embodiment of this application provides a communications apparatus, including a receiving module and a processing module.

The receiving module is configured to receive broadcast information sent by a network device, where the broadcast information includes K pieces of identification information, the K pieces of identification information respectively correspond to configuration information of K reference signals, and K is an integer greater than or equal to 1.

The processing module is configured to determine the configuration information of the K reference signals that respectively corresponds to the K pieces of identification information.

In a possible implementation, the processing module is specifically configured to determine, based on a preset correspondence between identification information and configuration information of a reference signal, the configuration information of the K reference signals that respectively corresponds to the K pieces of identification information.

According to a twelfth aspect, an embodiment of this application provides a communications apparatus, including a processing module and a sending module.

The processing module is configured to generate broadcast information, where the broadcast information includes identification information of configuration information of all of K reference signals.

The sending module is configured to send the broadcast information through broadcast.

In a possible implementation, there is a preset correspondence between configuration information of a reference signal and identification information.

With reference to any one of the first aspect to the fourth aspect and the seventh aspect to the tenth aspect, in a possible implementation, the following descriptions may be further included.

In a possible implementation, the first information includes identification information of reference configuration information, and the reference configuration information includes the N configuration parameters.

In a possible implementation, the first information includes the N configuration parameters.

In a possible implementation, the N configuration parameters include one or more of the following: a periodicity, a slot offset, an occupied orthogonal frequency division multiplexing (Orthogonal Frequency Division Multiplexing, OFDM) symbol location, a frequency domain resource element (Resource Element, RE) offset, a quantity of ports, a code division multiplexing (code division multiplexing, CDM) type, a frequency domain density, a scrambling identity (Identity, ID), a mapped start resource block (Resource Block, RB), and a quantity of mapped resource blocks RBs.

According to a thirteenth aspect, an embodiment of this application provides a communications apparatus, including a memory and a processor. The memory is coupled to the processor. The memory is configured to store program instructions. The processor is configured to invoke the program instructions in the memory to perform the communications method according to any one of the first aspect or the possible implementations of the first aspect.

Alternatively, the processor is configured to invoke the program instructions in the memory to perform the communications method according to any one of the second aspect or the possible implementations of the second aspect.

Alternatively, the processor is configured to invoke the program instructions in the memory to perform the communications method according to any one of the third aspect or the possible implementations of the third aspect.

Alternatively, the processor is configured to invoke the program instructions in the memory to perform the communications method according to any one of the fourth aspect or the possible implementations of the fourth aspect.

Alternatively, the processor is configured to invoke the program instructions in the memory to perform the communications method according to any one of the fifth aspect or the possible implementations of the fifth aspect.

Alternatively, the processor is configured to invoke the program instructions in the memory to perform the communications method according to any one of the sixth aspect or the possible implementations of the sixth aspect.

In a possible implementation, there are one or more processors. In a possible implementation, the communications apparatus may further include a transceiver, and the processor is configured to control the transceiver to receive and send a signal.

According to a fourteenth aspect, an embodiment of this application provides a chip or a chip system. The chip or the chip system includes at least one processor and a communications interface, the communications interface and the at least one processor are interconnected through a line, and the at least one processor is configured to run a computer program or instructions, to perform the communications method according to any one of the first aspect or the possible implementations of the first aspect, or perform the communications method according to any one of the second aspect or the possible implementations of the second aspect, or perform the communications method according to any one of the third aspect or the possible implementations of the third aspect, or perform the communications method according to any one of the fourth aspect or the possible implementations of the fourth aspect, or perform the communications method according to any one of the fifth aspect or the possible implementations of the fifth aspect, or perform the communications method according to any one of the sixth aspect or the possible implementations of the sixth aspect.

The communications interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

According to a fifteenth aspect, an embodiment of this application provides a communications apparatus, including:

a module, a component, or a circuit configured to implement the communications method according to the first aspect; or a module, a component, or a circuit configured to implement the communications method according to the second aspect; or a module, a component, or a circuit configured to implement the communications method according to the third aspect; or a module, a component, or a circuit configured to implement the communications method according to the fourth aspect; or a module, a component, or a circuit configured to implement the communications method according to the fifth aspect; or a module, a component, or a circuit configured to implement the communications method according to the sixth aspect.

According to a sixteenth aspect, an embodiment of this application provides a communications apparatus, including one or more processors and a communications unit. The one or more processors are configured to support the apparatus in performing corresponding functions of the terminal device or the network device in the foregoing method. The communications unit is configured to support the apparatus in communicating with another device, to implement a receiving function and/or a sending function.

In a possible implementation, the apparatus may further include one or more memories. The memory is configured to be coupled to the processor, and the memory stores program instructions and/or data necessary for a corresponding communications apparatus. The one or more memories may be integrated with the processor, or may be disposed separately from the processor. This is not limited in this application.

The communications unit may be a transceiver or a transceiver circuit. In a possible implementation, the transceiver may alternatively be an input/output circuit or an interface.

According to a seventeenth aspect, an embodiment of this application provides a communications system. The system includes the foregoing terminal device and the foregoing network device.

According to an eighteenth aspect, an embodiment of this application provides a computer-readable storage medium, configured to store a computer program.

The computer program includes instructions used to perform the method according to any one of the first aspect or the possible implementations of the first aspect.

Alternatively, the computer program includes instructions used to perform the method according to any one of the second aspect or the possible implementations of the second aspect.

Alternatively, the computer program includes instructions used to perform the method according to any one of the third aspect or the possible implementations of the third aspect.

Alternatively, the computer program includes instructions used to perform the method according to any one of the fourth aspect or the possible implementations of the fourth aspect.

Alternatively, the computer program includes instructions used to perform the method according to any one of the fifth aspect or the possible implementations of the fifth aspect.

Alternatively, the computer program includes instructions used to perform the method according to any one of the sixth aspect or the possible implementations of the sixth aspect.

According to a nineteenth aspect, an embodiment of this application provides a computer program product. The computer program product includes computer program code, and when the computer program code is run on a computer, the computer is enabled to perform the method according to any one of the first aspect or the possible implementations of the first aspect; or the computer is enabled to perform the method according to any one of the second aspect or the possible implementations of the second aspect; or the computer is enabled to perform the method according to any one of the third aspect or the possible implementations of the third aspect; or the computer is enabled to perform the method according to any one of the fourth aspect or the possible implementations of the fourth aspect; or the computer is enabled to perform the method according to any one of the fifth aspect or the possible implementations of the fifth aspect; or the computer is enabled to perform the method according to any one of the sixth aspect or the possible implementations of the sixth aspect.

According to the communications method, apparatus, and system provided in embodiments of this application, the terminal device does not directly receive configuration information of each reference signal, but restores the configuration information of each reference signal based on same first information and second information corresponding to each reference signal. In this way, the network device does not need to directly send the configuration information of each reference signal to the terminal device, to reduce signaling overheads of the broadcast information. In addition, the terminal device obtains configuration information of more reference signals by using same broadcast information.

DETAILED DESCRIPTION OF ILLUSTRATIVE EMBODIMENTS

Figure 1:
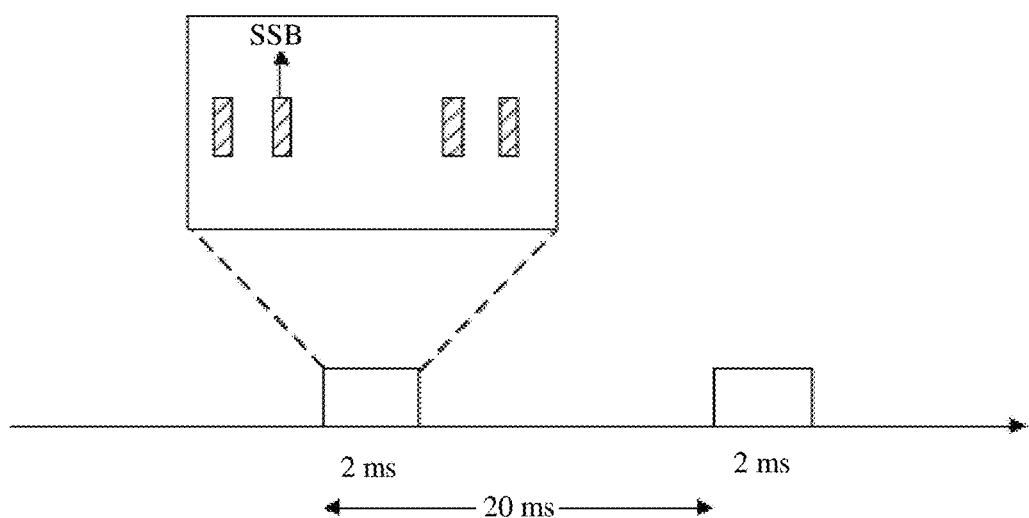
FIG. 1 is a schematic diagram of a configuration of an SSB.
Figure 2:
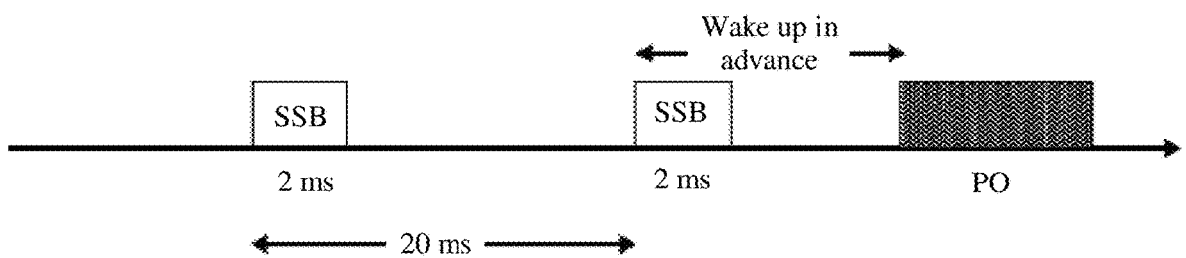
FIG. 2 is a schematic diagram in which UE wakes up in advance and receives an SSB.
Figure 3:
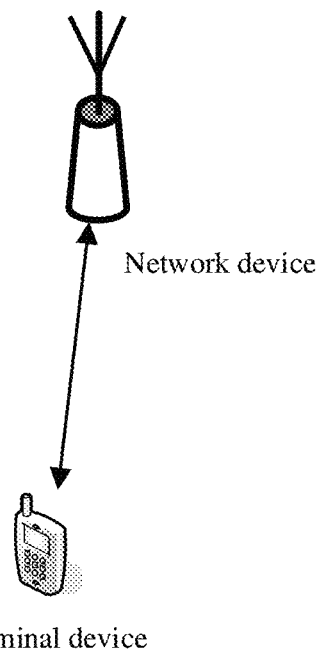
FIG. 3 is a schematic diagram of a communications system according to an embodiment of this application.

FIG. 3 is a schematic diagram of a communications system according to an embodiment of this application. As shown in FIG. 3, the communications system includes a network device and a terminal device.

In the following descriptions, some terms in this application are described, to help a person skilled in the art have a better understanding.

Figure 4:
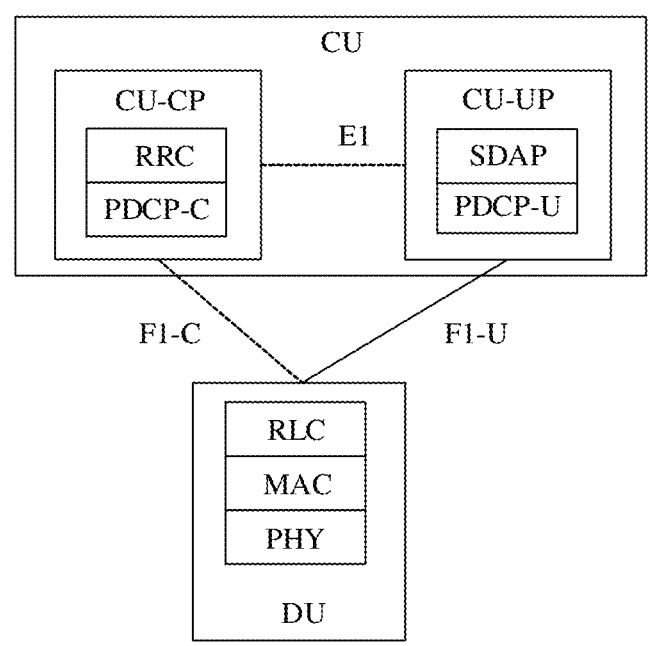
FIG. 4 is a schematic diagram of a protocol stack of a network device according to an embodiment of this application.

Network device: The network device is also referred to as a radio access network (Radio Access Network, RAN) device, is a device that connects a terminal device to a wireless network, and may be an evolved NodeB (Evolved NodeB, eNB or eNodeB) in long term evolution (Long Term Evolution, LTE), a relay station or an access point, a base station in a 5G network, for example, a transmission reception point (Transmission Reception Point, TRP), or a controller. This is not limited herein. In a possible manner, an access network device may be a base station (for example, a gNB) in a CU-DU split architecture. FIG. 4 is a schematic diagram of a protocol stack of a network device according to an embodiment of this application. The RAN device may be connected to a core network device (for example, a core network in LTE or a core network in 5G). It may be understood that the base station is divided into a CU and a DU from a perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a radio resource control (Radio Resource Control, RRC) layer, a service data adaptation protocol (Service Data Adaptation Protocol, SDAP) layer, and a packet data convergence protocol (packet data convergence protocol, PDCP) layer are distributed to the CU, and functions of a radio link control (radio link control, RLC) layer, a media access control (Media Access Control, MAC) layer, a physical (physical, PHY) layer, and the like are distributed to the DU. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and a function of a protocol layer above the RLC layer are distributed to the CU, and other functions of the RLC layer and a function of a protocol layer below the RLC layer are distributed to the DU. In another design, functions of the CU or the DU may alternatively be obtained through division based on a service type or another system requirement. For example, division is performed based on a latency, a function whose processing time needs to meet a latency requirement is distributed to the DU, and a function whose processing time does not need to meet the latency requirement is distributed to the CU. In another design, the CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Functions of the CU may be implemented by one entity, or may be implemented by different entities. For example, the functions of the CU may be further divided. For example, a control plane (CP) is separated from a user plane (UP), in other words, a CU control plane (CU-CP) and a CU user plane (CU-UP) are obtained. For example, the CU-CP and the CU-UP may be implemented by different function entities. The CU-CP and the CU-UP may be coupled to the DU to jointly implement functions of the base station. In a possible manner, the CU-CP is responsible for control plane functions, and mainly includes RRC and PDCP-C. The PDCP-C is mainly responsible for data encryption and decryption, integrity protection, data transmission, and the like on a control plane. The CU-UP is responsible for user plane functions, and mainly includes SDAP and PDCP-U. The SDAP is mainly responsible for processing data of the core network and mapping a data flow (flow) to a bearer. The PDCP-U is mainly responsible for encryption and decryption, integrity protection, header compression, serial number maintenance, data transmission, and the like on a data plane. The CU-CP and the CU-UP are connected through an E1 interface. On behalf of the gNB, the CU-CP is connected to the core network through an Ng interface, and is connected to the DU through F1-C (the control plane). The CU-UP is connected to the DU through F1-U (the user plane). Certainly, in another possible implementation, the PDCP-C is also in the CU-UP.

Terminal device: The terminal device may be a wireless terminal device or a wired terminal device. The wireless terminal device may be a device having a wireless transceiver function, and may be deployed on land, including an indoor device, an outdoor device, a handheld device, or a vehicle-mounted device; or may be deployed on a water surface (for example, on a ship); or may be deployed in the air (for example, on an airplane, a balloon, or a satellite). The terminal device may be a mobile phone (mobile phone), a tablet computer (Pad), a computer with a wireless transceiver function, a virtual reality (Virtual Reality, VR) terminal, an augmented reality (Augmented Reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. This is not limited herein. It may be understood that, in embodiments of this application, the terminal device may also be referred to as user equipment (user equipment, UE).

In a 5G mobile communications system, a status of a terminal device includes a connected state, an idle state, and an inactive (inactive) state. When the terminal device is in the connected state, the terminal device establishes an air interface connection to a network device, and communicates with the network device based on the air interface connection. When the terminal device is in the idle state, the air interface connection between the terminal device and the network device is broken, the terminal device no longer stores context information, and the terminal device can receive only broadcast information sent by the network device. When the terminal device is in the inactive state, the air interface connection between the terminal device and the network device is broken, but the terminal device continues to store the context information. When the terminal device enters the connected state from the inactive state, the terminal device can quickly restore to the connected state based on the stored context information.

When the terminal device is in the inactive state or the idle state, the terminal device periodically receives a paging (paging) message sent by the network device. A specific process is as follows: When the terminal device in the inactive state or the idle state generates a downlink service, the network device needs to notify the terminal device that there is the downlink service, and enable the terminal device to enter the connected state. Currently, the network device sends the paging message to notify the terminal device that there is the downlink service. To avoid excessively high power consumption of the terminal device, the network device periodically sends the paging message. One paging occasion (paging occasion, PO) occurs in each cycle (paging DRX cycle). The network device may deliver the paging message on the PO, and the terminal device detects whether there is the paging message.

When monitoring the paging message, the terminal device first needs to monitor paging downlink control information (downlink control information, DCI). The paging DCI is identified by using a paging radio network temporary identifier (radio network temporary identifier, RNTI). Only UE to which a corresponding paging RNTI is allocated can detect the paging DCI. After receiving the paging DCI, the terminal device (usually a plurality of terminal devices) receives, according to an indication of the paging DCI, a physical downlink shared channel (Physical Downlink Shared Channel, PDSCH) carrying the paging message. If the terminal device detects an identity (Identity, ID) of the terminal device in the paging message, the terminal device initiates a random access procedure to enter a connected state. In short, the paging DCI may be used to notify a group of terminal devices of a paging message that "a terminal device may need to enter the connected state", and the paging message further notifies the group of terminal devices of specific terminal devices that actually need to enter the connected state.

Before receiving the paging DCI on the PO, the terminal device needs to perform operations such as AGC adjustment and time-frequency synchronization in advance, to ensure that receiving performance of the paging DCI is high enough. A reference signal sent by the network device needs to be used for these operations. Currently, configuration information of the reference signal may be sent to the UE by using a system information block (system information block, SIB) message, and a maximum of 2976 bits can be sent in one SIB message. Configuration information of each reference signal requires approximately 80 bits. To be specific, configuration information of a maximum of 37 reference signals can be broadcast in one SIB message.

When a network side uses a broadcast message to broadcast configuration information of an additional (additional) reference signal, if it is expected that RS resources as available as possible can be provided for UEs in a cell, considering that locations at which the UEs in the cell receive paging are evenly distributed in terms of time, a network may need to broadcast a plurality of sets of TRSs/CSI-RSs to better support UEs of different POs.

In addition, in a millimeter-wave band, a base station may send signals in a maximum of 64 beam directions. If it is expected to assist UEs in all directions, at least 64 sets of configuration information are required.

As described above, in NR, a maximum of 37 configurations can be broadcast in one SIB message, which is definitely insufficient.

Therefore, how to reduce signaling overheads of the configuration information of the reference signal is a problem that needs to be resolved.

Based on this, this application proposes that the network device may broadcast the configuration information of the reference signal resource by using the broadcast information in the following four manners:

In a first manner, configuration is performed at two levels. One level is a same part (which may be referred to as a common part) in configuration information of reference signals, and the other level is a part other than the common part in the configuration information of the reference signals.

In a second manner, configuration is performed at two levels. One level is reference configuration information, and the other level is a part that is in configuration information of each reference signal and that is different from the reference configuration information.

In a third manner, configuration is performed at two levels. One level is reference configuration information, and the other level is an increment/a decrement of a part that is in configuration information of each reference signal and that is different from the reference configuration information relative to a value of the reference configuration information.

In a fourth manner, some configuration information of a reference signal is predefined, and identification information of the configuration information of the reference signal is broadcast during broadcast.

Methods in embodiments of this application can resolve the foregoing problem.

Figure 5:
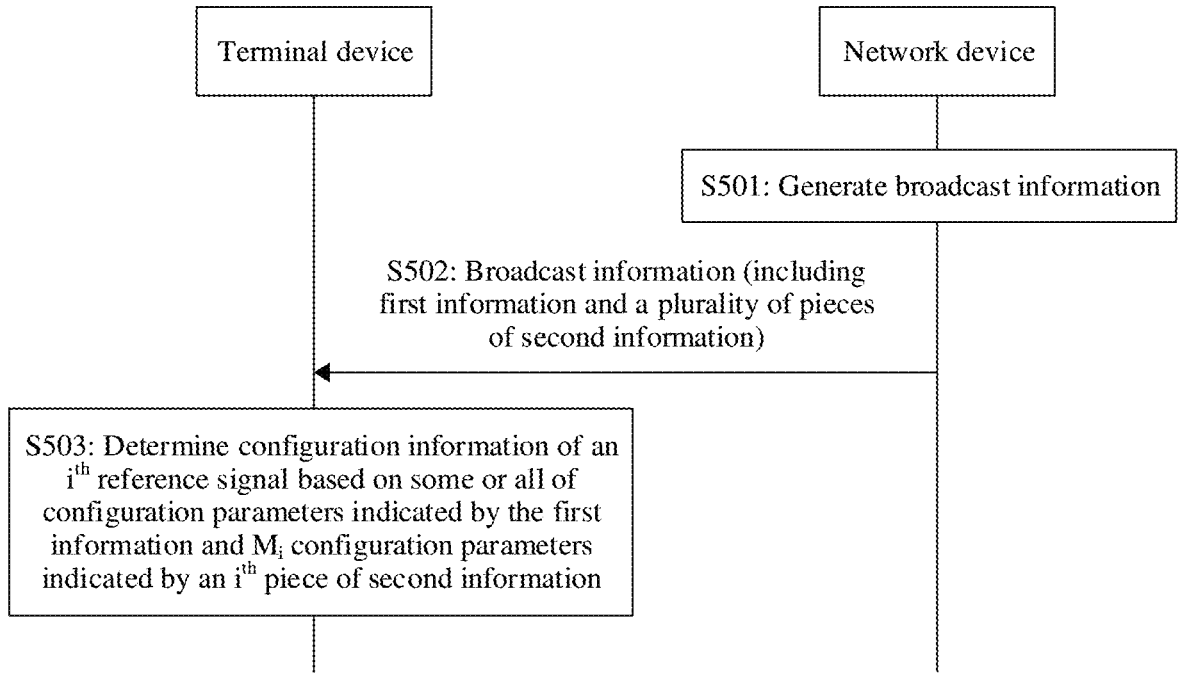
FIG. 5 is a flowchart of a communications method according to an embodiment of this application.

FIG. 5 is a flowchart of a communications method according to an embodiment of this application. As shown in FIG. 5, the method in this embodiment may include the following steps:

S501: A network device generates broadcast information.

S502: The network device sends the broadcast information, and correspondingly, a terminal device receives the broadcast information sent by the network device, where the broadcast information includes first information and a plurality of pieces of second information.

S503: The terminal device determines configuration information of an $i^{th}$ reference signal based on some or all of configuration parameters indicated by the first information and $M_i$ configuration parameters indicated by an $i^{th}$ piece of second information.

In this embodiment, the network device determines configuration information of each of a plurality of reference signals. The $i^{th}$ reference signal in the plurality of reference signals is used as an example, where i is an integer greater than or equal to 1. The configuration information of the $i^{th}$ reference signal includes $Q_i$, configuration parameters. The network device determines N configuration parameters, and determines the $M_i$ configuration parameters of the $i^{th}$ reference signal based on the configuration information of the plurality of reference signals. The network device generates the first information based on the N configuration parameters, where the first information is used to indicate the N configuration parameters, and N is an integer greater than or equal to 1. The network device generates the $i^{th}$ piece of second information based on the $M_i$ configuration parameters of the $i^{th}$ reference signal, where the $i^{th}$ piece of second information is used to indicate the $M_i$ configuration parameters of the $i^{th}$ reference signal, $M_i$ is an integer greater than or equal to 0, and a plurality of pieces of second information are generated in total. The plurality of pieces of second information respectively correspond to the plurality of reference signals. $Q_i$ is greater than or equal to N, and $Q_i$ is greater than or equal to $M_i$. It should be noted that a value of $M_i$ may vary with a value of i.

The network device generates the broadcast information based on the first information and the plurality of pieces of second information, where the broadcast information includes the first information and the plurality of pieces of second information; and then sends the broadcast information through broadcast. Correspondingly, one or more terminal devices receive the broadcast information sent by the network device. Descriptions are provided below by using an example in which one of the terminal devices performs processing after receiving the broadcast information. A process of another terminal device is similar to that of the terminal device. Details are not described herein again.

After receiving the broadcast information sent by the network device, the terminal device determines the configuration information of the $i^{th}$ reference signal, that is, the $Q_i$ configuration parameters of the $i^{th}$ reference signal, based on some or all of the configuration information indicated by the first information and the $M_i$ configuration parameters indicated by the $i^{th}$ piece of second information. Therefore, the terminal device can determine the configuration information of the plurality of reference signals.

Optionally, the reference signal may be one or more of the following: a primary synchronization signal (primary synchronization signal, PSS), a secondary synchronization signal (secondary synchronization signal, SSS), a channel state information reference signal (channel state information reference signal, CSI-RS), and a tracking reference signal (tracking reference signal, TRS).

Optionally, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

In the communications method in this embodiment, the network device sends the broadcast information, where the broadcast information includes the first information and the plurality of pieces of second information, the first information is used to indicate the N configuration parameters, and the $i^{th}$ piece of second information is used to indicate the $M_i$ configuration parameters of the $i^{th}$ reference signal. After receiving the broadcast information, the one or more terminal devices determine the configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes the $Q_i$ configuration parameters, $Q_i$ is greater than or equal to N, and $Q_i$ is greater than or equal to $M_i$. Therefore, the terminal device does not directly receive the configuration information of each reference signal, but restores the configuration information of each reference signal based on same first information and second information corresponding to each reference signal. In this way, the network device does not need to directly send the configuration information of each reference signal to the terminal device, to reduce signaling overheads of the broadcast information. In addition, the terminal device obtains configuration information of more reference signals by using same broadcast information.

The following describes the foregoing solution in detail by using several specific embodiments.

In some embodiments, the N configuration parameters are same configuration parameters in the configuration information of the plurality of reference signals. The N pieces of configuration information may be all same configuration parameters in the configuration information of the plurality of reference signals, or may be some same configuration parameters in the configuration information of the plurality of reference signals.

A possible implementation of S503 is as follows: The terminal device determines the N configuration parameters in the $Q_i$ configuration parameters based on the first information, and determines the remaining $M_i$ configuration parameters in the $Q_i$ configuration parameters based on the $i^{th}$ piece of second information. In this embodiment, the terminal device obtains N configuration parameters based on the first information, and determines the N configuration parameters as the N configuration parameters in the $Q_i$ configuration parameters of the $i^{th}$ reference signal; and obtains $M_i$ configuration parameters based on the $i^{th}$ piece of second information, and determines the $M_i$ configuration parameters as the $M_i$ configuration parameters in the $Q_i$ configuration parameters, to obtain the $Q_i$ configuration parameters of the $i^{th}$ reference signal. In other words, the $Q_i$ configuration parameters of the $i^{th}$ reference signal include both the N configuration parameters and the $M_i$ configuration parameters.

Optionally, the $i^{th}$ piece of second information includes the $M_i$ configuration parameters. Optionally, the first information includes the N configuration parameters.

Optionally, parameter names of the N configuration parameters may be specified in advance. For example, it is specified in advance that the first information may include configuration parameters with a parameter name 1, a parameter name 2, and a parameter name 3. The network device may determine whether in the configuration information of the plurality of reference signals, configuration parameters corresponding to parameter names 1 are the same, configuration parameters corresponding to parameter names 2 are the same, and configuration parameters corresponding to parameter names 3 are the same. If the network device determines that the configuration parameters corresponding to the parameter names 2 in the configuration information of the plurality of reference signals are the same, the network device determines that the configuration parameters corresponding to the same parameter name 2 are the N configuration parameters. Optionally, if configuration parameters corresponding to parameter names 4 in the configuration parameters of the plurality of reference signals are the same, the N configuration parameters do not include the configuration parameters corresponding to the parameter names 4.

Optionally, the parameter names of the N configuration parameters may indicate same configuration parameters in the plurality of reference signals. For example, configuration information of each reference signal may include configuration parameters with a parameter name 1, a parameter name 2, a parameter name 3, and a parameter name 4. The network device may determine whether in the configuration information of the plurality of reference signals, configuration parameters corresponding to parameter names 1 are the same, configuration parameters corresponding to parameter names 2 are the same, configuration parameters corresponding to parameter names 3 are the same, and configuration parameters corresponding to parameter names 4 are the same. If the network device determines that in the configuration information of the plurality of reference signals, the configuration parameters corresponding to the parameter names 2 are the same and the configuration parameters corresponding to the parameter names 4 are the same, the network device determines that the configuration parameters corresponding to the same parameter name 2 and the configuration parameters corresponding to the same parameter name 4 are the N configuration parameters.

Descriptions are provided below by using two reference signals as an example.

Figure 6:
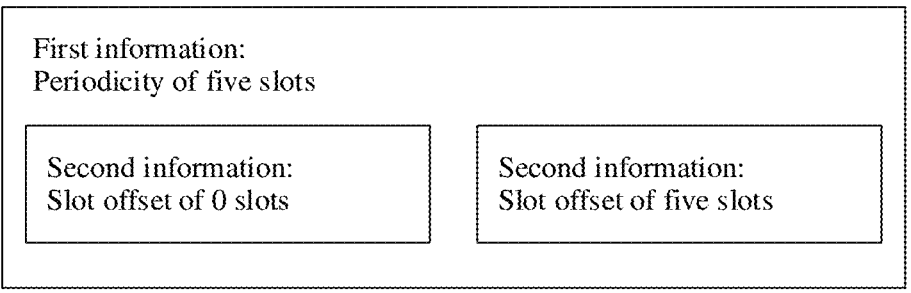
FIG. 6 is a schematic diagram of first information and second information according to an embodiment of this application.

If configuration information of the two reference signals includes a periodicity and a slot offset, and configuration information of a reference signal 1 and configuration information of a reference signal 2 include a same periodicity, the first information includes the same periodicity. As shown in FIG. 6, the same periodicity is five slots, second information of the reference signal 1 includes a slot offset (o slots) of the reference signal 1, and second information of the reference signal 2 includes a slot offset (three slots) of the reference signal 2. Correspondingly, the terminal device may determine, based on the first information and the second information of the reference signal 1, that the configuration information of the reference signal 1 includes a periodicity of five slots and a slot offset of 0 slots, and determine, based on the first information and the second information of the reference signal 2, that the configuration information of the reference signal 2 includes a periodicity of five slots and a slot offset of three slots.

Figure 7:
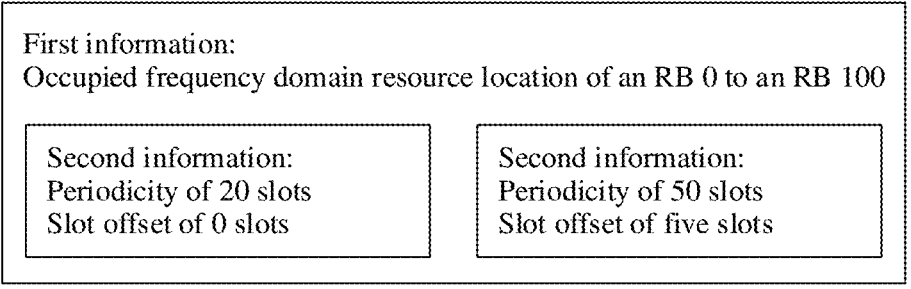
FIG. 7 is another schematic diagram of first information and second information according to an embodiment of this application.

If the configuration information of the two reference signals includes a periodicity, a slot offset, and an occupied frequency domain resource location, and configuration information of a reference signal 1 and configuration information of a reference signal 2 include a same occupied frequency domain resource location, the first information includes the same occupied frequency domain resource location. As shown in FIG. 7, the occupied frequency domain resource location is an RB 0 to an RB 100, second information of the reference signal 1 includes a periodicity (20 slots) and a slot offset (0 slots), and second information of the reference signal 2 includes a periodicity (40 slots) and a slot offset (five slots). Correspondingly, the terminal device may determine, based on the first information and the second information of the reference signal 1, that the configuration information of the reference signal 1 includes an occupied frequency domain resource location of an RB 0 to an RB 100, a periodicity of 20 slots, and a slot offset of 0 slots, and determine, based on the first information and the second information of the reference signal 2, that the configuration information of the reference signal 2 includes an occupied frequency domain resource location of an RB 0 to an RB 100, a periodicity of 40 slots, and a slot offset of five slots.

For example, the reference signal is a CSI-RS. In a related technology, configuration information of the CSI-RS is configured by using NZP-CSI-RS-Resource. Details are shown below:

```
NZP-CSI-RS-Resource ::=        SEQUENCE {
    nzp-CSI-RS-ResourceId        NZP-CSI-RS-ResourceId,
    resourceMapping              CSI-RS-ResourceMapping,
    powerControlOffset           INTEGER (-8..15),
    powerControlOffsetSS         ENUMERATED{db-3, db0, db3, db6}
OPTIONAL, -- Need R
    scramblingID                 ScramblingId,
    periodicityAndOffset         CSI-ResourcePeriodicityAndOffset   OPTIONAL,
-- Cond PeriodicOrSemiPersistent
    qcl-InfoPeriodicCSI-RS       TCI-StateId    OPTIONAL, -- Cond Periodic
    ...
}
``` nzp-CSI-RS-ResourceId is an index value of a CSI-RS resource.

resourceMapping is a frequency domain location indication of the CSI-RS.

powerControlOffset and powerControlOffsetSS are CSI-RS transmit power offset indications.

scramblingID is a scrambling ID of the CSI-RS, and is used to generate a random sequence used by the CSI-RS.

periodicityAndOffset is a time domain periodicity and an offset of the CSI-RS. qcl-InfoPeriodicCSI-RS is quasi-colocation (quasi-colocation, QCL) information of a periodic CSI-RS.

For example, the reference signal is a CSI-RS. In a related technology, configuration information of the CSI-RS is configured by using CSI-RS-ResourceConfigMobility. Details are shown below:

```
CSI-RS-CellMobility ::=       SEQUENCE {
    cellId                    PhysCellId,
    csi-rs-MeasurementBW      SEQUENCE {
        nrofPRBs              ENUMERATED { size24, size48, size96, size192, size264},
        startPRB              INTEGER(0..2169)
    },
    density                   ENUMERATED {d1,d3}    OPTIONAL, --NeedR
    csi-rs-ResourceList-Mobility       SEQUENCE (SIZE  (1..maxNrofCSI-RS-ResourcesRRM)) OF CSI-RS-Resource-Mobility
}
CSI-RS-Resource-Mobility ::=     SEQUENCE {
    csi-RS-Index          CSI-RS-Index,
    slotConfig            CHOICE {
        ms4                INTEGER (0..31),
        ms5                INTEGER (0..39),
        ms10               INTEGER (0..79),
        ms20               INTEGER (0..159),
        ms40               INTEGER (0..319)
    },
    associatedSSB         SEQUENCE{
        ssb-Index         SSB-Index,
        isQuasiColocated  BOOLEAN
    }                              OPTIONAL, --Need R
    frequencyDomainAllocation   CHOICE {
        row1              BIT STRING (SIZE (4)),
        row2              BIT STRING (SIZE (12))
    },
    firstOFDMSymbolInTimeDomain     INTEGER (0..13),
    sequenceGenerationConfig        INTEGER (0..1023),
    ...
}
``` cellId is a cell ID.

csi-rs-MeasurementBW is measurement bandwidth of the CSI-RS, where nrofPRBs is a quantity of PRBs, that is, a width of an occupied frequency domain resource, and startPRB is a start location of a PRB, that is, a start location of the occupied frequency domain resource.

density is a frequency domain density.

csi-rs-ResourceList-Mobility is a CSI-RS resource list used for mobility measurement, where the list includes a plurality of pieces of CSI-RS-Resource-Mobility, and each piece of CSI-RS-Resource-Mobility is configuration information of one CSI-RS resource.

csi-RS-Index is an index value of the CSI-RS resource.

slotConfig is a time domain resource indication of the CSI-RS. For example, ms4 indicates that a periodicity is 4 ms, and a value INTEGER (0 . . . 31) following ms4 indicates that a time domain offset is one of 0 slots to 31 slots; ms5 indicates that a periodicity is 5 ms, and a value INTEGER (0 . . . 9) following ms5 indicates that a time domain offset is one of 0 slots to 39 slots; and by analogy.

associatedSSB is an indication of an associated synchronization signal and PBCH block (synchronization signal and PBCH block, SSB), where ssb-Index is an index value of the SSB, and isQuasiColocated indicates whether there is a QCL relationship between the CSI-RS and the SSB.

frequencyDomainAllocation is a frequency domain location indication of the CSI-RS.

firstOFDMSymbolInTimeDomain is a location of a first OFDM symbol occupied by the CSI-RS.

sequenceGenerationConfig is configuration information used to generate a random sequence used by the CSI-RS.

It can be learned from the foregoing descriptions that, in this embodiment of this application, when the configuration information of the reference signal is configured in a form similar to NZP-CSI-RS-Resource and a form similar to CSI-RS-ResourceConfigMobility, representation forms of the configuration parameters may be different. For example, the configuration parameter is an occupied frequency domain resource location. When the configuration information of the reference signal is configured in a form similar to NZP-CSI-RS-Resource, the configuration parameter is represented as resource mapping. When the configuration information of the reference signal is configured in a form similar to CSI-RS-ResourceConfigMobility, the configuration parameter is represented as nrofPRBs and startPRB.

In this embodiment, the first information is used to indicate the same configuration parameters in the plurality of reference signals. In this way, each piece of second information may not need to indicate a configuration parameter that is the same as that in configuration information of another reference signal. Therefore, the same configuration parameter is indicated by using one piece of information, and does not need to be indicated by using a plurality of pieces of information, to reduce signaling overheads of the broadcast information.

In some embodiments, the N configuration parameters are reference configuration parameters, and the $M_i$ configuration parameters are configuration parameters that are in the configuration information of the $i^{th}$ reference signal and that are different from the N configuration parameters.

A value of $Q_i$ is equal to a value of N, and the N configuration parameters in the first information and the $M_i$ configuration parameters include configuration parameters with a same parameter name. For example, the N configuration parameters include a periodicity, the $M_i$ configuration parameters also include a periodicity, and the periodicity (for example, 20 slots) in the N configuration parameters is different from the periodicity (for example, 40 slots) in the $M_i$ configuration parameters.

Optionally, a possible implementation of S503 is as follows: The terminal device determines the $M_i$ configuration parameters in the $Q_i$ configuration parameters based on the $i^{th}$ piece of second information; and determines a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters.

In this embodiment, the terminal device determines $M_i$ configuration parameters based on the $i^{th}$ piece of second information, and determines the $M_i$ configuration parameters as the $M_i$ configuration parameters of the $i^{th}$ reference signal. The terminal device determines the N configuration parameters based on the first information. Because the N configuration parameters and the $M_i$ configuration parameters include the configuration parameters with the same parameter name, and the configuration parameters in the N configuration parameters do not belong to the configuration information of the $i^{th}$ reference signal, the terminal device determines that the configuration parameter other than the configuration parameter whose parameter name is the same as the parameter names of the $M_i$ configuration parameters in the N configuration parameters is the configuration parameter other than the $M_i$ configuration parameters in the configuration information of the $i^{th}$ reference signal.

It should be noted that when $M_i$ is equal to 0, the $i^{th}$ piece of second information is empty information, indicating that the configuration information of the $i^{th}$ reference signal is the N configuration parameters indicated by the first information. When a value of $M_i$ is equal to a value of N, it indicates that the configuration information of the $i^{th}$ reference signal includes the $M_i$ configuration parameters and does not include any one of the N configuration parameters indicated by the first information.

In this embodiment, the N configuration parameters indicated by the first information are used as the reference configuration parameters, and the second information is used to indicate a configuration parameter that is in the configuration information of the reference signal and that is different from the N configuration parameters. In this way, each piece of second information may not need to indicate a configuration parameter that is the same as that in the reference configuration parameters, to reduce signaling overheads of the broadcast information.

Optionally, the first information includes the N configuration parameters.

Optionally, the first information includes identification information of reference configuration information, and the reference configuration information includes the N configuration parameters. In this embodiment, there is a correspondence between the identification information and the configuration information. The correspondence may be preset. After receiving the first information, the terminal device determines, based on the identification information in the first information, the configuration information corresponding to the identification information, uses the configuration information as the reference configuration information, and determines configuration parameters in the configuration information as the N configuration parameters. The identification information is, for example, an index number.

Therefore, in this embodiment, the N configuration parameters are indicated by using the identification information, and the identification information occupies fewer bits, to further reduce signaling overheads of the broadcast information.

The $i^{th}$ piece of second information may indicate the $M_i$ configuration parameters in the following two possible implementations.

In a possible implementation, the $i^{th}$ piece of second information includes the $M_i$ configuration parameters. Correspondingly, that the terminal device determines the $M_i$ configuration parameters in the $Q_i$ configuration parameters based on the $i^{th}$ piece of second information may be as follows: The terminal device determines the $M_i$ configuration parameters in the $i^{th}$ piece of second information as the $M_i$ configuration parameters in the $Q_i$ configuration parameters.

The broadcast information may include the following example:

```
BroadcastedResourceSet ::=      SEQUENCE {
    nzp-CSI-ResourceSetId           NZP-CSI-RS-ResourceSetId,
    referenceConfiguration          NZP-CSI-RS-Resource,
    Resources                       SEQUENCE (SIZE (1..maxNrofResources))
OF NZP-CSI-RS-Resource, ...
}
```

BroadcastedResourceSet is a broadcast reference signal resource set.

nzp-CSI-ResourceSetId is an index value of the resource set.

referenceConfiguration is a reference configuration, and includes one piece of NZP-CSI-RS-Resource, that is, configuration information of one CSI-RS resource.

"Resources" includes a plurality of (that is, K) pieces of NZP-CSI-RS-Resource, and each piece of NZP-CSI-RS-Resource is configuration information of one CSI-RS resource. To be specific, "Resources" indicates configuration information of each reference signal.

referenceConfiguration is represented as the first information. "Resources" includes a plurality of pieces of second information.

If NZP-CSI-RS-Resource (content of the second information) in Resources is empty, it indicates that configuration information that is of a reference signal and that corresponds to the second information completely reuses a configuration parameter in referenceConfiguration. If NZP-CSI-RS-Resource in Resources includes a configuration parameter, and a value of the configuration parameter is different from a value of a parameter in referenceConfiguration, the resource uses a value configured in NZP-CSI-RS-Resource in Resources.

For example, the configuration information of each reference signal includes a periodicity and a slot offset. The first information includes a periodicity of 20 slots and a slot offset of 0 slots. If the second information of the first reference signal includes a slot offset of five slots, it means that the configuration information of the first reference signal includes a periodicity of 20 slots and a slot offset of five slots.

In this embodiment, it may also be understood that the terminal device first determines the reference configuration information based on the first information, and then replaces/overwrites (replaces/overrides/overwrites) configuration parameters with a same parameter name in the reference configuration information by using the configuration parameters indicated by the $i^{th}$ piece of second information, to obtain the configuration information of the $i^{th}$ reference signal. The foregoing example is still used as an example. The first information includes a periodicity of 20 slots and a slot offset of 0 slots. Second information of a first reference signal includes a slot offset of five slots. The terminal device may first determine that a reference configuration is "a periodicity is 20 slots and a slot offset is 0 slots", then replace "a slot offset is 0 slots" in the reference configuration information with "a slot offset is five slots" included in the configuration information of the first reference signal, and finally determine that the configuration information of the first reference signal is "a periodicity is 20 slots and a slot offset is five slots".

In another possible implementation, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$, configuration parameters. For example, the first parameter name is a periodicity. If a periodicity in the N configuration parameters is 20 slots, and a periodicity in the $M_i$ configuration parameters is 40 slots, correspondingly, the $i^{th}$ piece of second information includes a 20-slot offset of the periodicity.

Correspondingly, that the terminal device determines the $M_i$ configuration parameters in the $Q_i$ configuration parameters based on the $i^{th}$ piece of second information may be as follows: The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

If same parameter names of configuration parameters in the $M_i$ configuration parameters and the N configuration parameters are a periodicity and a slot offset, for example, in the N configuration parameters, the periodicity is 20 slots and the slot offset is 0 slots, the second information includes a 20-slot offset of the periodicity and a 5-slot offset of the slot offset. Correspondingly, in the $M_i$ configuration parameters obtained by the terminal device, the periodicity is 40 slots and the slot offset is five slots.

In this embodiment, the configuration parameter is indicated by using the offset of the configuration parameter. Compared with the configuration parameter, the offset occupies fewer bits, to further reduce signaling overheads of the broadcast information. For example, assuming that a value range of the "slot offset" is 0 to 19, five bits are required for indication. If an offset is used for indication, and it is considered that a difference between a slot offset of a reference signal and the "slot offset in the N configuration parameters" does not exceed ±5 slots, four bits are required for indication, to save one bit.

In this embodiment, the same parameter name may mean that names are completely the same, or names are not completely the same but are used to indicate values of a same parameter. For example, a name of a parameter in the first information is periodicity (that is, a periodicity), and a name of a parameter in the second information is periodicityOffset or periodicityDelta (that is, an offset of the periodicity). The parameter names of the two parameters are not completely the same, but are used to determine a same parameter (that is, a periodicity), and therefore can also be considered as a same parameter name.

It should be noted that when $M_i$ is equal to 0, the $i^{th}$ piece of second information is empty information, indicating that the configuration information of the $i^{th}$ reference signal is completely the same as the N configuration parameters indicated by the first information.

In some embodiments, if a value of $Q_i$ is equal to a value of N, the network device may determine, from configuration information of a plurality of reference signals, that configuration parameters in configuration information of one reference signal are the N configuration parameters, where configuration information of remaining reference signals is respectively used to generate corresponding second information. Correspondingly, the terminal device may further determine configuration information of a $(K+1)^{th}$ reference signal based on the first information. To be specific, the terminal device determines the N configuration parameters based on the first information, and then determines the configuration information of the $(K+1)^{th}$ reference signal based on the N configuration parameters.

Optionally, the configuration information of the $(K+1)^{th}$ reference signal includes the N configuration parameters. For example, the terminal device determines the N configuration parameters as the configuration information of the $(K+1)^{th}$ reference signal.

Therefore, in this manner, an amount of configuration information that is of a reference signal and that is broadcast by the network device may be further increased.

Figure 8:
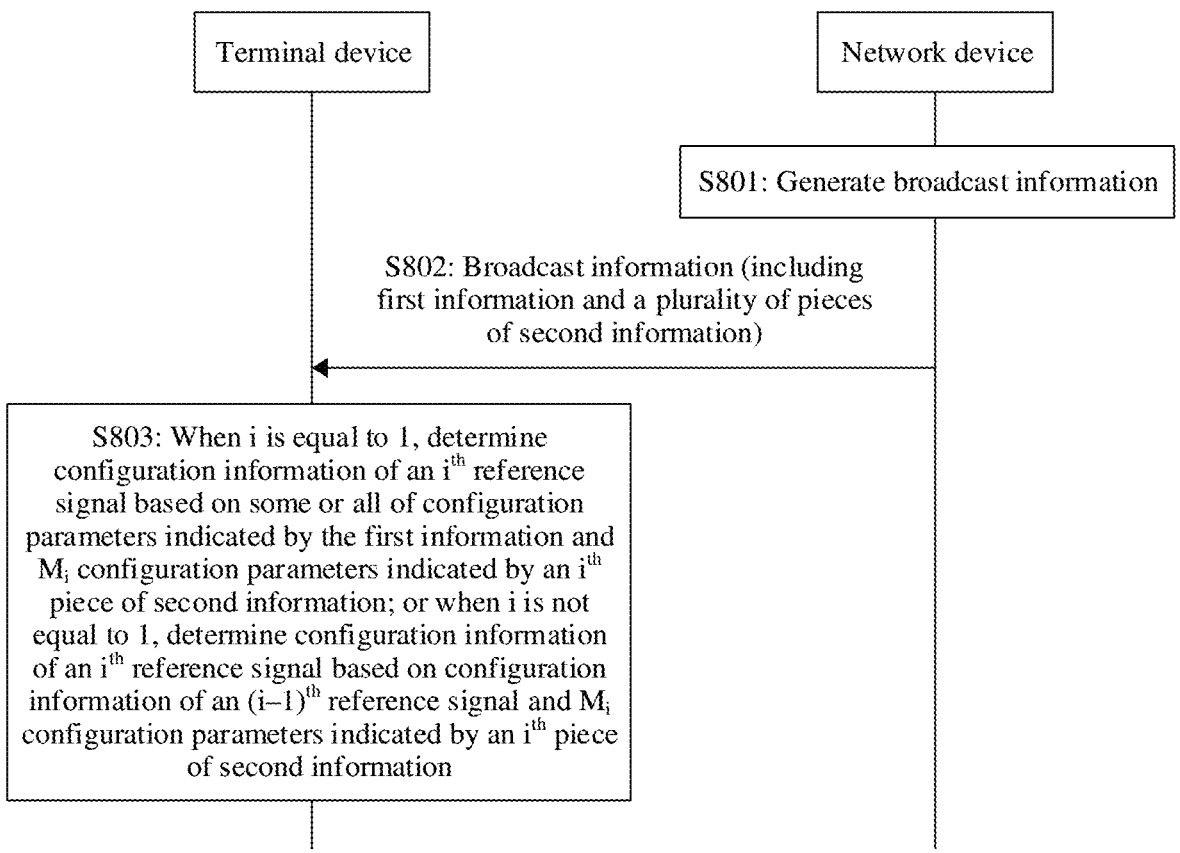
FIG. 8 is a flowchart of a communications method according to another embodiment of this application.

FIG. 8 is a flowchart of a communications method according to another embodiment of this application. As shown in FIG. 8, the method in this embodiment may include the following steps:

S801: A network device generates broadcast information.

S802: The network device sends the broadcast information, and correspondingly, a terminal device receives the broadcast information sent by the network device, where the broadcast information includes first information and a plurality of pieces of second information.

S803: When i is equal to 1, the terminal device determines configuration information of an $i^{th}$ reference signal based on some or all of configuration parameters indicated by the first information and $M_i$ configuration parameters indicated by an $i^{th}$ piece of second information; or when i is not equal to 1, the terminal device determines configuration information of an $i^{th}$ reference signal based on configuration information of an $(i-1)^{th}$ reference signal and $M_i$ configuration parameters indicated by an $i^{th}$ piece of second information.

In this embodiment, the network device determines configuration information of each of a plurality of reference signals. The $i^{th}$ reference signal in the plurality of reference signals is used as an example, where i is an integer greater than or equal to 1. The configuration information of the $i^{th}$ reference signal includes $Q_i$ configuration parameters. The network device may further determine N configuration parameters, and the network device generates the first information based on the N configuration parameters, where the first information is used to indicate the N configuration parameters, and N is an integer greater than or equal to 1. The network device determines $M_i$ configuration parameters based on the N configuration parameters and configuration information of a first reference signal, and determines a first piece of second information based on the $M_i$ configuration parameters. The network device determines $M_2$ configuration parameters based on the configuration information of the first reference signal and configuration information of a second reference signal, and determines a second piece of second information based on the $M_2$ configuration parameters. By analogy, a plurality of pieces of second information are generated in total, and the $i^{th}$ piece of second information is used to indicate the $M_i$ configuration parameters of the $i^{th}$ reference signal. The plurality of pieces of second information respectively correspond to the plurality of reference signals. $Q_i$ is greater than or equal to N, and $Q_i$ is greater than or equal to $M_i$. It should be noted that a value of $M_i$ may vary with a value of i.

The network device generates the broadcast information based on the first information and the plurality of pieces of second information, where the broadcast information includes the first information and the plurality of pieces of second information, and then sends the broadcast information through broadcast. Correspondingly, one or more terminal devices receive the broadcast information sent by the network device. Descriptions are provided below by using an example in which one of the terminal devices performs processing after receiving the broadcast information. A process of another terminal device is similar to that of the terminal device. Details are not described herein again.

After the terminal device receives the broadcast information sent by the network device, the terminal device determines the configuration information of the first reference signal based on some or all of the configuration parameters indicated by the first information and the $M_1$ configuration parameters indicated by the first piece of second information, that is, i is equal to 1.

The terminal device determines the configuration information of the second reference signal based on the $M_2$ configuration parameters indicated by the second piece of second information and the configuration information of the first reference signal, that is, i is equal to 2.

The terminal device determines configuration information of a third reference signal based on $M_3$ configuration parameters indicated by a third piece of second information and the configuration information of the second reference signal, that is, i is equal to 2.

By analogy, the terminal device can obtain configuration information of a plurality of reference signals.

Optionally, the reference signal may be one or more of the following: a PSS, an SSS, a CSI-RS, and a TRS.

Optionally, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

In the communications method in this embodiment, the network device sends the broadcast information, where the broadcast information includes the first information and the plurality of pieces of second information, the first information is used to indicate the N configuration parameters, and the $i^{th}$ piece of second information is used to indicate the $M_i$ configuration parameters of the $i^{th}$ reference signal. After the one or more terminal devices receive the broadcast information, when i is equal to 1, the terminal device determines the configuration information of the $i^{th}$ reference signal based on some or all of the configuration parameters indicated by the first information and the $M_i$ configuration parameters indicated by the $i^{th}$ piece of second information; or when i is not equal to 1, the terminal device determines the configuration information of the $i^{th}$ reference signal based on the configuration information of the $(i-1)^{th}$ reference signal and the $M_i$ configuration parameters indicated by the $i^{th}$ piece of second information, where the configuration information of the $i^{th}$ reference signal includes the $Q_i$ configuration parameters, $Q_i$ is greater than or equal to N, and $Q_i$ is greater than or equal to $M_i$. Therefore, the terminal device does not directly receive the configuration information of each reference signal, but restores the configuration information of each reference signal based on second information of each reference signal and a corresponding configuration parameter. In this way, the network device does not need to directly send the configuration information of each reference signal to the terminal device, to reduce signaling overheads of the broadcast information. In addition, the terminal device obtains configuration information of more reference signals by using same broadcast information.

In some embodiments, the N configuration parameters are reference configuration parameters of the first reference signal, and the $M_1$ configuration parameters of the first reference signal are configuration parameters that are in the configuration information of the first reference signal and that are different from the N configuration parameters. configuration parameters of the $(i-1)^{th}$ reference signal are reference configuration parameters of the $i^{th}$ reference signal, and the $M_i$ configuration parameters of the $i^{th}$ reference signal are configuration parameters that are in the configuration information of the $i^{th}$ reference signal and that are different from the configuration information of the $i^{th}$ reference signal.

A value of $Q_i$ is equal to a value of N. When i is equal to 1, the N configuration parameters in the first information and the $M_i$ configuration parameters include configuration parameters with a same parameter name. When i is not equal to 1, $Q_{i-1}$ configuration parameters of the $(i-1)^{th}$ reference signal and the $M_i$ configuration parameters include configuration parameters with a same parameter name. For example, the N configuration parameters include a periodicity, the $M_1$ configuration parameters of the first reference signal also include a periodicity, and the periodicity (for example, 20 slots) in the N configuration parameters is different from the periodicity (for example, 40 slots) in the $M_1$ configuration parameters. For example, the configuration information of the first reference signal includes a slot offset, the $M_2$ configuration parameters of the second reference signal include a slot offset, and the slot offset (for example, 0 slots) in the configuration information of the first reference signal is different from the slot offset (for example, five slots) in the $M_2$ configuration parameters of the second reference signal.

Optionally, a possible implementation of S803 is as follows: When i is equal to 1, the terminal device determines the $M_i$ configuration parameters in the $Q_i$ configuration parameters based on the $i^{th}$ piece of second information; and determines a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters. When i is not equal to 1, the terminal device determines the $M_i$ configuration parameters in the $Q_i$ configuration parameters based on the $i^{th}$ piece of second information; and determines a configuration parameter other than the $M_i$ configuration parameters in the $Q_i$ configuration parameters based on a configuration parameter other than a configuration parameter whose parameter name is the same as any of parameter names of the $M_i$ configuration parameters in the $Q_{i-1}$ configuration parameters of the $(i-1)^{th}$ reference signal.

In this embodiment, when i is equal to 1, the terminal device determines $M_1$ configuration parameters based on the first piece of second information, and determines the $M_1$ configuration parameters as the $M_1$ configuration parameters of the first reference signal. The terminal device determines the N configuration parameters based on the first information. Because the N configuration parameters and the $M_1$ configuration parameters include configuration parameters with a same parameter name, and the configuration parameters in the N configuration parameters do not belong to the configuration information of the first reference signal, the terminal device determines that a configuration parameter other than a configuration parameter whose parameter name is the same as any of parameter names of the $M_1$ configuration parameters in the N configuration parameters is a configuration parameter other than the $M_1$ configuration parameters in the configuration information of the first reference signal. Therefore, the terminal device obtains the configuration information of the first reference signal, including $Q_i$ configuration parameters.

When i is not equal to 1, the terminal device determines $M_2$ configuration parameters based on the second piece of second information, and determines the $M_2$ configuration parameters as the $M_2$ configuration parameters of the second reference signal. Because the configuration information of the first reference signal and the $M_2$ configuration parameters include configuration parameters with a same parameter name, and the configuration parameters in the configuration information of the first reference signal do not belong to the configuration information of the second reference signal, the terminal device determines that a configuration parameter other than a configuration parameter whose parameter name is the same as any of parameter names of the $M_2$ configuration parameters in the configuration information of the first reference signal is a configuration parameter other than the $M_2$ configuration parameters in the configuration information of the second reference signal. Therefore, the terminal device obtains the configuration information of the second reference signal, including $Q_2$ configuration parameters.

By analogy, the terminal device obtains configuration information of all reference signals.

In this embodiment, the N configuration parameters indicated by the first information are used as reference configuration parameters, and the first piece of second information is used to indicate a configuration parameter that is in the configuration information of the first reference signal and that is different from the N configuration parameters. In addition, the configuration information of the $(i-1)^{th}$ reference signal is used as a reference configuration parameter, and the $i^{th}$ piece of second information is used to indicate a configuration parameter that is in the configuration information of the $i^{th}$ reference signal and that is different from the configuration information of the $(i-1)^{th}$ reference signal. In this way, each piece of second information may not need to indicate a configuration parameter that is the same as that in a corresponding reference configuration parameter, to reduce signaling overheads of the broadcast information.

Optionally, the first information includes the N configuration parameters.

Optionally, the first information includes identification information of reference configuration information, and the reference configuration information includes the N configuration parameters. In this embodiment, there is a correspondence between the identification information and the configuration information. The correspondence may be preset. After receiving the first information, the terminal device determines, based on the identification information in the first information, the configuration information corresponding to the identification information, uses the configuration information as the reference configuration information, and determines configuration parameters in the configuration information as the N configuration parameters. The identification information is, for example, an index number.

Therefore, in this embodiment, the N configuration parameters are indicated by using the identification information, and the identification information occupies fewer bits, to further reduce signaling overheads of the broadcast information.

The $i^{th}$ piece of second information may indicate the $M_i$ configuration parameters in the following two possible implementations.

In a possible implementation, the $i^{th}$ piece of second information includes the $M_i$ configuration parameters. Correspondingly, that the terminal device determines the $M_i$ configuration parameters in the $Q_i$ configuration parameters based on the $i^{th}$ piece of second information may be as follows: The terminal device determines the $M_i$ configuration parameters in the $i^{th}$ piece of second information as the $M_i$ configuration parameters in the $Q_i$ configuration parameters.

For example, the configuration information of each reference signal includes a periodicity and a slot offset. The first information includes a periodicity of 20 slots and a slot offset of 0 slots. If the first piece of second information includes a slot offset of five slots, it means that the configuration information of the first reference signal includes a periodicity of 20 slots and a slot offset of five slots. If the second piece of second information includes a periodicity of 40 slots, it means that the configuration information of the second reference signal includes a periodicity of 40 slots and a slot offset of five slots.

In this embodiment, it may also be understood that the terminal device first determines the reference configuration information based on the first information, and then replaces/overwrites (replaces/overrides/overwrites) configuration parameters with a same parameter name in the reference configuration information by using the configuration parameters indicated by the first piece of second information, to obtain the configuration information of the first reference signal. The terminal device determines the configuration information of the first reference signal as the reference configuration information, and replaces/overwrites (replaces/overrides/overwrites) configuration parameters with a same parameter name in the reference configuration information by using the configuration parameters indicated by the second piece of second information, to obtain the configuration information of the second reference signal. The terminal device determines the configuration information of the second reference signal as the reference configuration information, and replaces/overwrites (replaces/overrides/overwrites) configuration parameters with a same parameter name in the reference configuration information by using the configuration parameters indicated by the third piece of second information, to obtain the configuration information of the third reference signal. By analogy, details are not described herein again.

In another possible implementation, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

The first parameter name and the second parameter name are used to indicate that same parameter names corresponding to different reference signals are not necessarily the same. For example, the first parameter name is a periodicity. If a periodicity in the N configuration parameters is 20 slots, and a periodicity in the $M_1$ configuration parameters is 40 slots, correspondingly, the first piece of second information includes a 20-slot offset of the periodicity.

For example, the second parameter name is a slot offset. If a slot offset in the configuration information of the $(i-1)^{th}$ reference signal is 0 slots, and a slot offset in the $M_i$ configuration parameters is five slots, correspondingly, the $i^{th}$ piece of second information includes a 5-slot offset of the slot offset.

Correspondingly, when i is equal to 1, that the terminal device determines the $M_i$ configuration parameters in the $Q_i$ configuration parameters based on the $i^{th}$ piece of second information may be as follows: The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters. For a specific implementation process, refer to related descriptions in the foregoing embodiments. Details are not described herein again.

Correspondingly, when i is not equal to 1, that the terminal device determines the $M_i$ configuration parameters in the $Q_i$ configuration parameters based on the $i^{th}$ piece of second information may be as follows: The terminal device determines a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

If a same parameter name of configuration parameters in the $M_2$ configuration parameters of the second reference signal and the configuration information of the first reference signal is a periodicity, for example, in the configuration information of the first reference signal, a periodicity is 20 slots and a slot offset is 0 slots, the second piece of second information includes a 20-slot offset of the periodicity. Correspondingly, in the $M_2$ configuration parameters of the second reference signal that are obtained by the terminal device, a periodicity is 40 slots. Then, the terminal device may learn that the configuration information of the second reference signal includes a periodicity of 40 slots and a slot offset of 0 slots. If a same parameter name of configuration parameters in $M_3$ configuration parameters of the third reference signal and the configuration information of the second reference signal is a slot offset, the third piece of second information includes a 5-slot offset of the slot offset. Correspondingly, in the $M_3$ configuration parameters of the third reference signal that are obtained by the terminal device, a slot offset is five slots. Then, the terminal device may learn that the configuration information of the third reference signal includes a periodicity of 40 slots and a slot offset of five slots.

In this embodiment, the configuration parameter is indicated by using the offset of the configuration parameter. Compared with the configuration parameter, the offset occupies fewer bits, to further reduce signaling overheads of the broadcast information. For example, assuming that a value range of the "slot offset" is 0 to 19, five bits are required for indication. If an offset is used for indication, and it is considered that a difference between a slot offset of a reference signal and the "slot offset in the N configuration parameters" does not exceed ±5 slots, four bits are required for indication, to save one bit.

In this embodiment, the same parameter name may mean that names are completely the same, or names are not completely the same but are used to indicate values of a same parameter. For example, a name of a parameter in the first information is periodicity (that is, a periodicity), and a name of a parameter in the second information is periodicityOffset or periodicityDelta (that is, an offset of the periodicity). The parameter names of the two parameters are not completely the same, but are used to determine a same parameter (that is, a periodicity), and therefore can also be considered as a same parameter name.

It should be noted that when $M_i$ is equal to 0, the $i^{th}$ piece of second information is empty information, indicating that the configuration information of the $i^{th}$ reference signal is completely the same as the N configuration parameters indicated by the first information.

In some embodiments, if a value of $Q_i$ is equal to a value of N, the network device may determine, from configuration information of a plurality of reference signals, that configuration parameters in configuration information of one reference signal are the N configuration parameters, where configuration information of remaining reference signals is respectively used to generate corresponding second information. Correspondingly, the terminal device may further determine configuration information of a $(K+1)^{th}$ reference signal based on the first information. To be specific, the terminal device determines the N configuration parameters based on the first information, and then determines the configuration information of the $(K+1)^{th}$ reference signal based on the N configuration parameters.

Optionally, the configuration information of the $(K+1)^{th}$ reference signal includes the N configuration parameters. For example, the terminal device determines the N configuration parameters as the configuration information of the $(K+1)^{th}$ reference signal.

Therefore, in this manner, an amount of configuration information that is of a reference signal and that is broadcast by the network device may be further increased.

Figure 9:
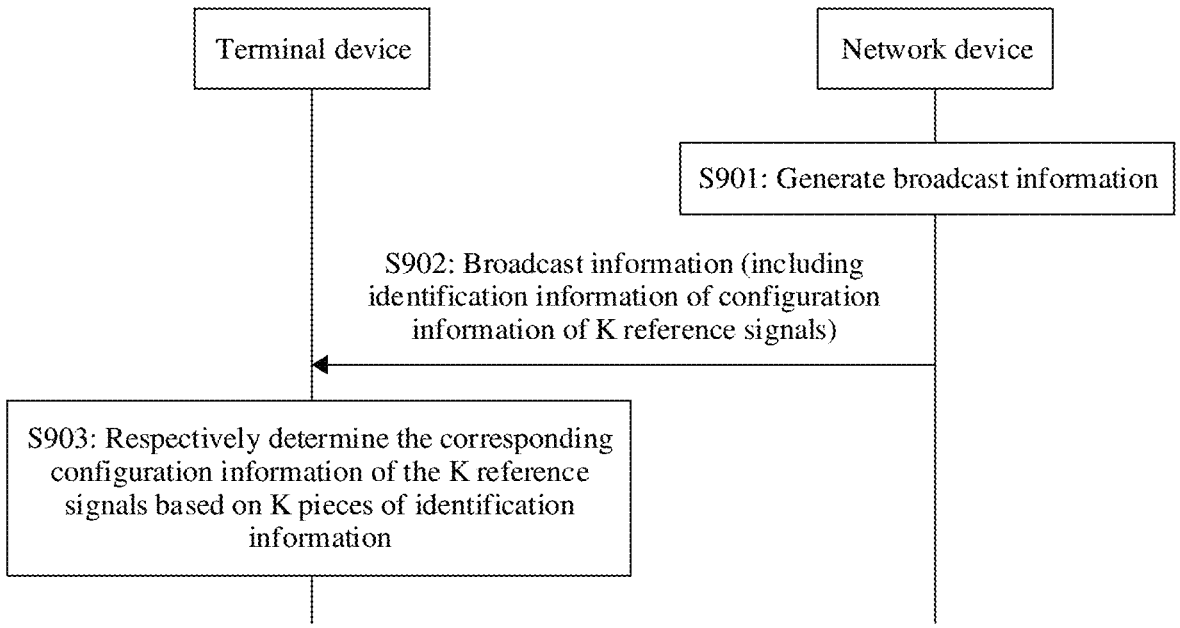
FIG. 9 is a flowchart of a communications method according to another embodiment of this application.

FIG. 9 is a flowchart of a communications method according to another embodiment of this application. As shown in FIG. 9, the method in this embodiment may include the following steps.

S901: A network device generates broadcast information.

S902: The network device sends the broadcast information, and correspondingly, a terminal device receives the broadcast information sent by the network device, where the broadcast information includes identification information of configuration information of K reference signals.

S903: The terminal device respectively determines the corresponding configuration information of the K reference signals based on K pieces of identification information.

In this embodiment, the network device determines the configuration information of all of the K reference signals, where K is an integer greater than or equal to 1. The network device respectively obtains the K pieces of identification information based on the configuration information of the K reference signals, where each piece of identification information corresponds to configuration information of one reference signal. The network device generates the broadcast information based on the K pieces of identification information, where the broadcast information includes the K pieces of identification information. Correspondingly, one or more terminal devices receive the broadcast information sent by the network device. Descriptions are provided below by using an example in which one of the terminal devices performs processing after receiving the broadcast information. A process of another terminal device is similar to that of the terminal device. Details are not described herein again.

After receiving the broadcast information sent by the network device, the terminal device respectively determines the corresponding configuration information of the K reference signals based on the K pieces of identification information.

Optionally, the reference signal may be one or more of the following: a PSS, an SSS, a CSI-RS, and a TRS.

Optionally, the configuration information of each reference signal includes one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

In some implementations, the terminal device and the network device preset a correspondence between configuration information of a reference signal and identification information, that is, predefine configuration information of a plurality of reference signals, and allocate identification information to the configuration information of each reference signal. Therefore, the network device determines the configuration information of the K reference signals from the predefined configuration information of the plurality of reference signals, and then determines, based on the preset correspondence between the configuration information of the reference signal and the identification information, the identification information respectively corresponding to the configuration information of the K reference signals. Correspondingly, after obtaining the K pieces of identification information from the broadcast information, the terminal device determines, based on the preset correspondence between the configuration information of the reference signal and the identification information, the configuration information of the reference signals that respectively corresponds to the K pieces of identification information.

Optionally, the identification information is an index number.

In the communications method in this embodiment, the network device sends the broadcast information, where the broadcast information includes the K pieces of identification information. After receiving the broadcast information, the one or more terminal devices respectively determine the corresponding configuration information of the K reference signals based on the K pieces of identification information. Therefore, the terminal device does not directly receive the configuration information of each reference signal, but determines the configuration information of each reference signal based on the received identification information. In this way, the network device does not need to directly send the configuration information of each reference signal to the terminal device, to reduce signaling overheads of the broadcast information. Further, the terminal device can obtain configuration information of more reference signals by using the broadcast information.

It should be noted that any one of the foregoing embodiments may be implemented independently, or any combination of at least two of the foregoing embodiments may be implemented. This is not limited.

It may be understood that, in the foregoing embodiments, the operations and steps implemented by the terminal device may alternatively be implemented by a component (for example, a chip or a circuit) that may be used in the terminal device. This is not limited in embodiments of this application. The operations and steps implemented by the network device may alternatively be implemented by a component (for example, a chip or a circuit) that may be used in the network device. This is not limited in embodiments of this application.

Optionally, in any one of the foregoing embodiments, the broadcast information is included in an SIB message sent by the network device through broadcast.

In a specific implementation, for example, the foregoing embodiments of this application may be applied to the following scenario:

A user uses a mobile phone. When the mobile phone is powered on, the mobile phone initiates random access to access a network (that is, enter a connected state), and receives, in the connected state, reference signal configuration information delivered by a network device, where the reference configuration information is used to configure some reference signal resources. If no service is transmitted for a period of time after the mobile phone is powered on, the network device indicates the mobile phone to enter a non-connected state (for example, an inactive state or an idle state). Then, the mobile phone needs to receive a paging message at a location of a PO. To reduce power consumption of the mobile phone, the mobile phone may still store the reference signal configuration information when entering the non-connected state, and receive a corresponding reference signal from the network device based on the reference signal configuration information, to perform time-frequency synchronization, AGC adjustment, and the like. When receiving configuration information of the corresponding reference signal, the mobile phone may use the solutions of embodiments in the solutions of the present invention, to reduce signaling overheads.

Figure 10:
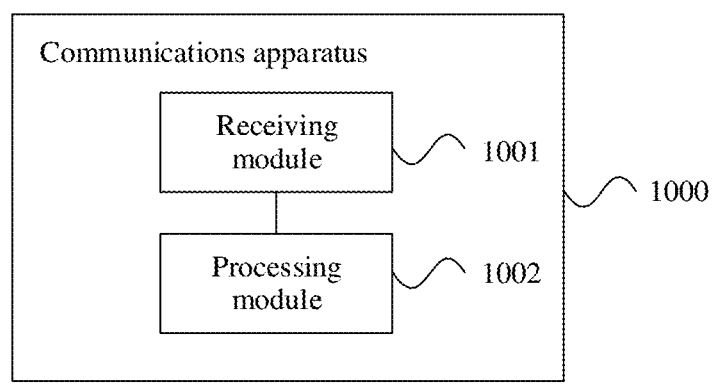
FIG. 10 is a schematic diagram of a structure of a communications apparatus according to an embodiment of this application.

FIG. 10 is a schematic diagram of a structure of a communications apparatus according to an embodiment of this application. As shown in FIG. 10, the communications apparatus may be a terminal device, or may be a component (for example, an integrated circuit or a chip) of the terminal device, or may be another communications module, and is configured to implement operations corresponding to the terminal device in any one of the foregoing embodiments. The communications apparatus 1000 in this embodiment includes a receiving module 1001 and a processing module 1002. The communications apparatus 1000 in this embodiment can implement the solution of the terminal device in any one of the foregoing embodiments by using the receiving module 1001 and the processing module 1002. Implementation principles and technical effects of the communications apparatus 1000 are similar to those of the terminal device. Details are not described herein again.

Figure 11:
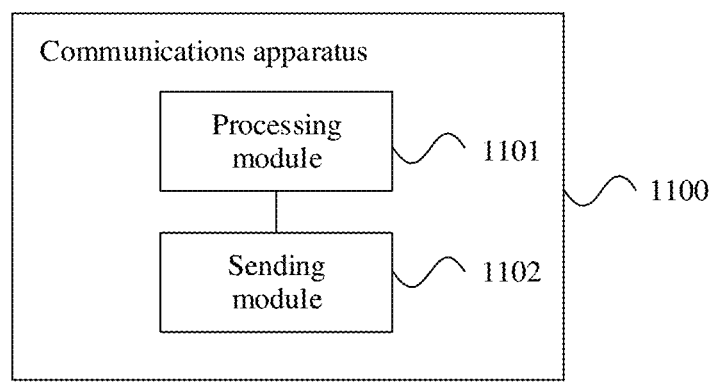
FIG. 11 is a schematic diagram of a structure of a communications apparatus according to another embodiment of this application.

FIG. 11 is a schematic diagram of a structure of a communications apparatus according to another embodiment of this application. As shown in FIG. 11, the communications apparatus may be a network device, or may be a component (for example, an integrated circuit or a chip) of the network device, or may be another communications module, and is configured to implement operations corresponding to the network device in any one of the foregoing embodiments. The communications apparatus 1100 in this embodiment includes a processing module 1101 and a sending module 1102. The communications apparatus 1100 in this embodiment can implement the solution of the network device in any one of the foregoing embodiments by using the processing module 1101 and the sending module 1102. Implementation principles and technical effects of the communications apparatus 1100 are similar to those of the network device. Details are not described herein again.

Figure 12:
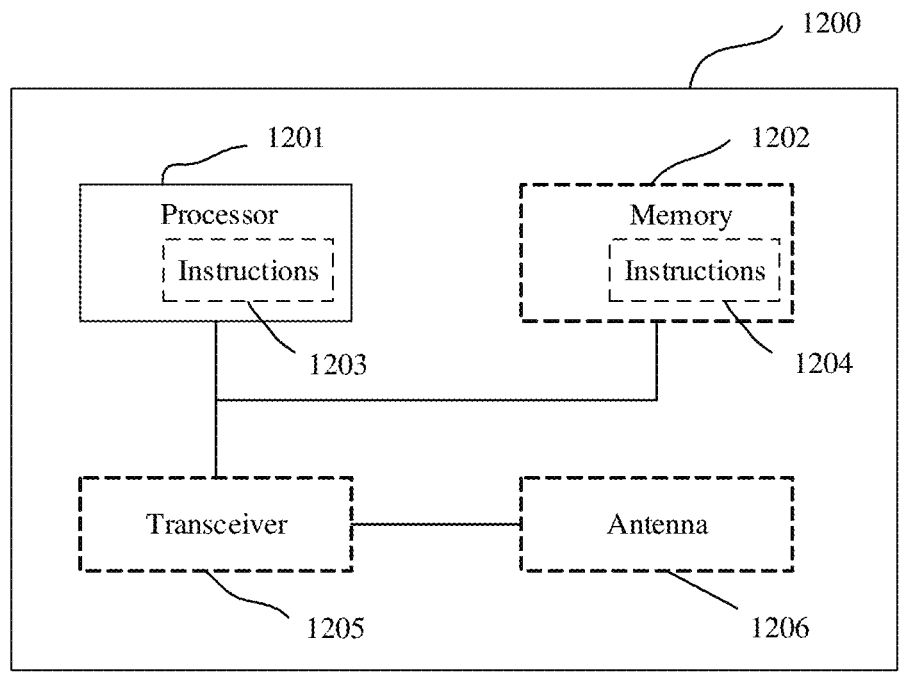
FIG. 12 is a schematic diagram of a structure of a communications apparatus according to another embodiment of this application.

FIG. 12 is a schematic diagram of a structure of a communications apparatus according to another embodiment of this application. As shown in FIG. 12, the communications apparatus 1200 in this embodiment may be the terminal device (or a component that can be used in the terminal device) or the network device (or a component that can be used in the network device) mentioned in the foregoing method embodiments. The communications apparatus may be configured to implement the method that corresponds to the terminal device or the network device and that is described in the foregoing method embodiments. For details, refer to descriptions in the foregoing method embodiments.

The communications apparatus 1200 may include one or more processors 1201. The processor 1201 may also be referred to as a processing unit, and may implement a specific control or processing function. The processor 1201 may be a general-purpose processor, a dedicated processor, or the like. For example, the processor 1201 may be a baseband processor or a central processing unit. The baseband processor may be configured to process a communication protocol and communication data. The central processing unit may be configured to: control the communications apparatus, execute a software program, and process data of the software program.

In a possible design, the processor 1201 may also store instructions 1203 or data (for example, intermediate data). The instructions 1203 may be run by the processor, so that the communications apparatus 1200 performs the method that corresponds to the terminal device or the network device and that is described in the foregoing method embodiments.

In another possible design, the communications apparatus 1200 may include a circuit, and the circuit may implement the sending, receiving, or communication function in the foregoing method embodiments.

In a possible implementation, the communications apparatus 1200 may include one or more memories 1202, and the memory 1202 may store instructions 1204. The instructions may be run on the processor, so that the communications apparatus 1200 performs the method described in the foregoing method embodiments.

In a possible implementation, the memory may also store data. The processor and the memory may be separately disposed, or may be integrated together.

In a possible implementation, the communications apparatus 1200 may further include a transceiver 1205 and/or an antenna 1206. The processor 1201 may be referred to as a processing unit, and controls the communications apparatus (a terminal device, a core network device, or a radio access network device). The transceiver 1205 may be referred to as a transceiver unit, a transceiver machine, a transceiver circuit, a transceiver, or the like, and is configured to implement a transceiver function of the communications apparatus.

In a design, if the communications apparatus 1200 is configured to implement operations corresponding to the terminal device in the foregoing embodiments, details are as follows: For example, the transceiver 1205 may receive broadcast information sent by a network device. The processor 1201 determines configuration information of an $i^{th}$ reference signal based on some or all of configuration parameters indicated by first information and $M_i$ configuration parameters indicated by an $i^{th}$ piece of second information.

For another example, the transceiver 1205 may receive broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal. When i is equal to 1, the processor 1201 may determine configuration information of the $i^{th}$ reference signal based on some or all of the configuration parameters indicated by the first information and the $M_i$ configuration parameters indicated by the $i^{th}$ piece of second information. When i is not equal to 1, the processor 1201 may determine configuration information of the $i^{th}$ reference signal based on configuration information of an $(i-1)^{th}$ reference signal and the $M_i$ configuration parameters indicated by the $i^{th}$ piece of second information.

For another example, the transceiver 1205 may receive broadcast information sent by a network device. The processor 1201 may determine configuration information of K reference signals that respectively corresponds to K pieces of identification information.

For specific implementation processes of the processor 1201 and the transceiver 1205, refer to related descriptions in the foregoing embodiments. Details are not described herein again.

In another design, if the communications apparatus is configured to implement operations corresponding to the network device in the foregoing embodiments, details are as follows:

For example, the processor 1201 may generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal. The transceiver 1205 may send the broadcast information through broadcast. Configuration information of the $i^{th}$ reference signal is related to some or all of the configuration parameters indicated by the first information and the $M_i$ configuration parameters indicated by the $i^{th}$ piece of second information, and the configuration information of the $i^{th}$ reference signal includes $Q_i$ configuration parameters.

For another example, the processor 1201 may generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal. The transceiver 1205 sends the broadcast information through broadcast. When i is equal to 1, configuration information of the $i^{th}$ reference signal is related to some or all of the configuration parameters indicated by the first information and the $M_i$ configuration parameters indicated by the $i^{th}$ piece of second information. When i is not equal to 1, configuration information of the $i^{th}$ reference signal is related to configuration information of an $(i-1)^{th}$ reference signal and the $M_i$ configuration parameters indicated by the $i^{th}$ piece of second information.

For another example, the processor 1201 may generate broadcast information, where the broadcast information includes identification information of configuration information of all of K reference signals. The transceiver 1205 may send the broadcast information through broadcast.

For specific implementation processes of the processor 1201 and the transceiver 1205, refer to related descriptions in the foregoing embodiments. Details are not described herein again.

The processor 1201 and the transceiver 1205 described in this application may be implemented on an integrated circuit (integrated circuit, IC), an analog IC, a radio frequency integrated circuit (radio frequency integrated circuit, RFIC), a mixed-signal IC, an application-specific integrated circuit (application-specific integrated circuit, ASIC), a printed circuit board (printed circuit board, PCB), an electronic device, or the like. The processor and the transceiver may also be manufactured by using various 1C process technologies, for example, a complementary metal oxide semiconductor (complementary metal oxide semiconductor, CMOS), an n-type metal oxide semiconductor (n-type metal oxide semiconductor, NMOS), a p-type metal oxide semiconductor (p-type metal oxide semiconductor, PMOS), a bipolar junction transistor (Bipolar Junction Transistor, BJT), a bipolar CMOS (BiCMOS), silicon germanium (SiGe), and gallium arsenide (GaAs).

Although the communications apparatus 1200 is described by using the terminal device or the network device as an example in the descriptions of the foregoing embodiments, a scope of the communications apparatus described in this application is not limited to the foregoing terminal device or network device, and the structure of the communications apparatus may not be limited by FIG. 12. The communications apparatus 1200 may be an independent device or may be a part of a large device. For example, the device may be:

(1) an independent integrated circuit IC, a chip, or a chip system or subsystem;
(2) a set of one or more ICs, where in a possible implementation, the IC set may further include a storage component configured to store data and/or instructions;
(3) an ASIC, for example, a modem (MSM);
(4) a module that can be embedded in another device;
(5) a receiver, a wireless device, a mobile unit, a network device, or the like; or
(6) another device or the like.

Figure 13:
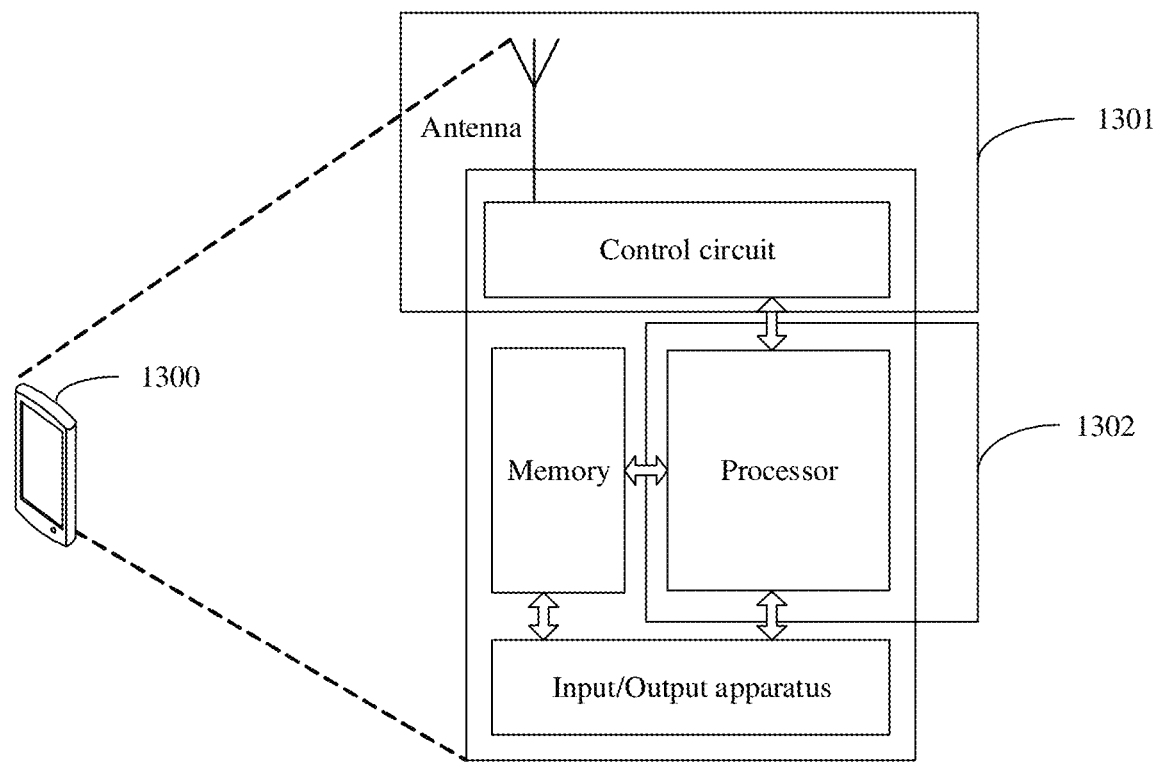
FIG. 13 is a schematic diagram of a structure of a terminal device according to an embodiment of this application.

FIG. 13 is a schematic diagram of a structure of a terminal device according to an embodiment of this application. The terminal device is applicable to the terminal device described in the foregoing embodiments of this application. For ease of description, FIG. 13 shows only main components of the terminal device. As shown in FIG. 13, the terminal device 1300 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal and process the radio frequency signal. The antenna is mainly configured to: receive and send a radio frequency signal in a form of an electromagnetic wave. The input/output apparatus, for example, a touchscreen, a display, or a keyboard, is mainly configured to: receive data entered by a user, and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the form of the electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. Actually, the terminal may include a plurality of processors and a plurality of memories. The memory may also be referred to as a storage medium, a storage device, or the like. This is not limited in this embodiment of this application.

In a possible implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 13 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna having a transceiver function and the control circuit may be considered as a transceiver module 1301 of the terminal device 1300, and the processor having a processing function may be considered as a processing module 1302 of the terminal device 1300. As shown in FIG. 13, the terminal device 1300 includes the transceiver module 1301 and the processing module 1302. The transceiver module may also be referred to as a transceiver, a transceiver machine, a transceiver apparatus, or the like. In a possible implementation, a component that is in the transceiver module 1301 and that is configured to implement a receiving function may be considered as a receiving module, and a component that is in the transceiver module 1301 and that is configured to implement a sending function may be considered as a sending module. That is, the transceiver module 1301 includes the receiving module and the sending module. For example, the receiving module may also be referred to as a receiver, a receiver machine, a receiver circuit, or the like, and the sending module may be referred to as a transmitter, a transmitter machine, a transmitter circuit, or the like.

Figure 14:
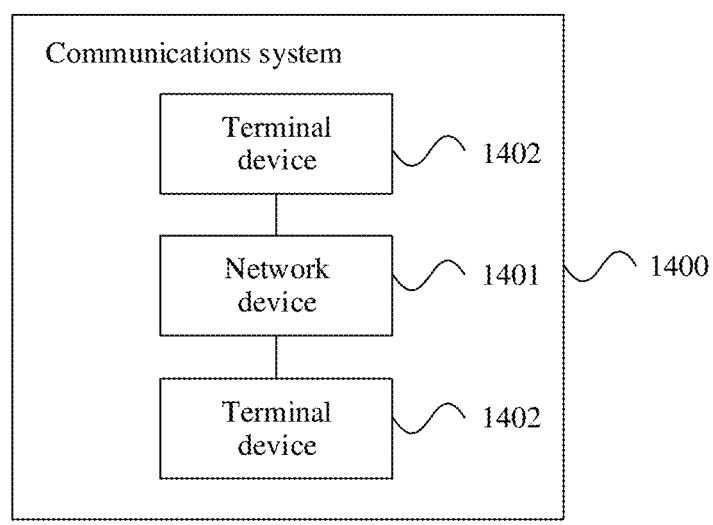
FIG. 14 is a schematic diagram of a structure of a communications system according to an embodiment of this application.

FIG. 14 is a schematic diagram of a structure of a communications system according to an embodiment of this application. As shown in FIG. 14, the communications system 1400 in this embodiment may include a network device 1401 and one or more terminal devices 1402. Two terminal devices 1402 are used as an example in the figure. The terminal device 1402 may use the structure in the apparatus embodiment shown in FIG. 10, FIG. 12, or FIG. 13, and may correspondingly perform the technical solution related to the terminal device in any one of the foregoing method embodiments. Implementation principles and technical effects of the terminal device 1402 are similar to those of the foregoing terminal device. Details are not described herein again. The network device 1401 may use the structure in the apparatus embodiment shown in FIG. 11 or FIG. 12, and may correspondingly perform the technical solution related to the network device in any one of the foregoing method embodiments. Implementation principles and technical effects of the network device 1401 are similar to those of the foregoing network device. Details are not described herein again.

With reference to the foregoing descriptions, this application further provides the following embodiments.

Embodiment 1: A communications method is provided. The method includes the following steps:

A terminal device receives broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The terminal device determines configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 2: According to the method in Embodiment 1, $Q_i$ is equal to a sum of N and $M_i$.

That the terminal device determines configuration information of the $i^{th}$ reference signal based on all of the configuration parameters indicated by the first information and the $M_i$ configuration parameters indicated by the $i^{th}$ piece of second information includes the following step:

The terminal device determines the N configuration parameters in the $Q_i$ configuration parameters based on the first information, and determines the remaining $M_i$ configuration parameters in the $Q_i$ configuration parameters based on the $i^{th}$ piece of second information.

Embodiment 3: According to the method in Embodiment 2, the $i^{th}$ piece of second information includes the $M_i$ configuration parameters.

Embodiment 4: According to the method in Embodiment 2 or Embodiment 3, the $Q_i$ configuration parameters include the N configuration parameters.

Embodiment 5: According to the method in Embodiment 1, $Q_i$ is equal to N, and the N configuration parameters in the first information and the $M_i$ configuration parameters include configuration parameters with a same parameter name.

Embodiment 6: According to the method in Embodiment 5, that the terminal device obtains configuration information of the $i^{th}$ reference signal based on some or all of the configuration parameters indicated by the first information and the $M_i$ configuration parameters indicated by the $i^{th}$ piece of second information includes the following steps:

The terminal device determines the $M_i$ configuration parameters in the $Q_i$ configuration parameters based on the $i^{th}$ piece of second information.

The terminal device determines a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters.

Embodiment 7: According to the method in Embodiment 6, the $i^{th}$ piece of second information includes the $M_i$ configuration parameters.

Embodiment 8: According to the method in Embodiment 6, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

Embodiment 9: According to the method in Embodiment 8, that the terminal device determines the $M_i$ configuration parameters in the $Q_i$ configuration parameters based on the $i^{th}$ piece of second information includes the following step:

The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

Embodiment 10: According to the method according to any one of Embodiment 5 to Embodiment 9, the method further includes the following step:

The terminal device determines configuration information of a $(K+1)^{th}$ reference signal based on the first information.

Embodiment 11: According to the method in Embodiment 10, the configuration information of the $(K+1)^{th}$ reference signal includes the N configuration parameters.

Embodiment 12: According to the method in any one of Embodiment 5 to Embodiment 11, the first information includes identification information of reference configuration information, and the reference configuration information includes the N configuration parameters.

Embodiment 13: According to the method in any one of Embodiment 1 to Embodiment 11, the first information includes the N configuration parameters.

Embodiment 14: According to the method in any one of Embodiment 1 to Embodiment 13, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 15: A communications method is provided. The method includes the following steps:

A network device generates broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The network device sends the broadcast information through broadcast.

Configuration information of the $i^{th}$ reference signal is related to some or all of the configuration parameters indicated by the first information and the $M_i$ configuration parameters indicated by the $i^{th}$ piece of second information, and the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 16: According to the method in Embodiment 15, $Q_i$ is equal to a sum of N and $M_i$.

The N configuration parameters in the $Q_i$ configuration parameters are related to the first information, and the remaining $M_i$ configuration parameters in the $Q_i$ configuration parameters are related to the i pieces of second information.

Embodiment 17: According to the method in Embodiment 16, the $i^{th}$ piece of second information includes the $M_i$ configuration parameters.

Embodiment 18: According to the method in Embodiment 16 or Embodiment 17, the $Q_i$ configuration parameters include the N configuration parameters.

Embodiment 19: According to the method in Embodiment 15, $Q_i$ is equal to N, and the N configuration parameters in the first information and the $M_i$ configuration parameters include configuration parameters with a same parameter name.

Embodiment 20: According to the method in Embodiment 19, the $M_i$ configuration parameters in the $Q_i$ configuration parameters are related to the $i^{th}$ piece of second information, and a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

Embodiment 21: According to the method in Embodiment 20, the $i^{th}$ piece of second information includes the $M_i$ configuration parameters.

Embodiment 22: According to the method in Embodiment 20, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

Embodiment 23: According to the method in Embodiment 22, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

Embodiment 24: According to the method in any one of Embodiment 19 to Embodiment 23, the first information is used to determine configuration information of a $(K+1)^{th}$ reference signal.

Embodiment 25: According to the method in Embodiment 24, the configuration information of the $(K+1)^{th}$ reference signal includes the N configuration parameters.

Embodiment 26: According to the method in any one of Embodiment 19 to Embodiment 25, the first information includes identification information of reference configuration information, and the reference configuration information includes the N configuration parameters.

Embodiment 27: According to the method in any one of Embodiment 15 to Embodiment 25, the first information includes the N configuration parameters.

Embodiment 28: According to the method in any one of Embodiment 15 to Embodiment 27, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 29: A communications method is provided. The method includes the following steps:

A terminal device receives broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

When i is equal to 1, the terminal device determines configuration information of the $i^{th}$ reference signal based on some or all of the configuration parameters indicated by the first information and the $M_i$ configuration parameters indicated by the $i^{th}$ piece of second information.

When i is not equal to 1, the terminal device determines configuration information of the $i^{th}$ reference signal based on configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 30: According to the method according to Embodiment 29, $Q_i$ is equal to N.

When i is equal to 1, the N configuration parameters in the first information and the $M_i$ configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

Embodiment 31: According to the method in Embodiment 29, that the terminal device determines configuration information of the $i^{th}$ reference signal based on some or all of the configuration parameters indicated by the first information and the $M_i$ configuration parameters indicated by the $i^{th}$ piece of second information includes the following steps:

The terminal device determines the $M_i$ configuration parameters in the $Q_i$ configuration parameters based on the $i^{th}$ piece of second information.

The terminal device determines a configuration parameter other than the $M_i$ configuration parameters in the $Q_i$ configuration parameters based on a configuration parameter other than a configuration parameter whose parameter name is the same as any of parameter names of the $M_i$ configuration parameters in the $N^{th}$ configuration parameter.

That the terminal device determines configuration information of the $i^{th}$ reference signal based on configuration information of an $(i-1)^{th}$ reference signal and the $M_i$ configuration parameters indicated by the $i^{th}$ piece of second information includes the following steps:

The terminal device determines the $M_i$ configuration parameters in the $Q_i$ configuration parameters based on the $i^{th}$ piece of second information.

The terminal device determines a configuration parameter other than the $M_i$ configuration parameters in the $Q_i$ configuration parameters based on a configuration parameter other than a configuration parameter whose parameter name is the same as any of parameter names of the $M_i$ configuration parameters in the $Q_{i-1}$ configuration parameters of the $(i-1)^{th}$ reference signal.

Embodiment 32: According to the method in Embodiment 31, the $i^{th}$ piece of second information includes the $M_i$ configuration parameters.

Embodiment 33: According to the method in Embodiment 31, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

Embodiment 34: According to the method in Embodiment 33, when i is equal to 1, that the terminal device determines the $M_i$ configuration parameters in the $Q_i$ configuration parameters based on the $i^{th}$ piece of second information includes the following step:

The terminal device determines a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

When i is not equal to 1, that the terminal device determines the $M_i$ configuration parameters in the $Q_i$ configuration parameters based on the $i^{th}$ piece of second information includes the following step:

The terminal device determines a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

Embodiment 35: According to the method in any one of Embodiment 29 to Embodiment 34, the method further includes the following step:

The terminal device determines configuration information of a $(K+1)^{th}$ reference signal based on the first information.

Embodiment 36: According to the method in Embodiment 35, the configuration information of the $(K+1)^{th}$ reference signal includes the N configuration parameters.

Embodiment 37: According to the method in any one of Embodiment 29 to Embodiment 36, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 38: According to the method in any one of Embodiment 29 to Embodiment 37, the first information includes the N configuration parameters.

Embodiment 39: According to the method in any one of Embodiment 29 to Embodiment 37, the first information includes identification information of reference configuration information, and the reference configuration information includes the N configuration parameters.

Embodiment 40: A communications method is provided. The method includes the following steps:

A network device generates broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The network device sends the broadcast information through broadcast.

When i is equal to 1, configuration information of the $i^{th}$ reference signal is related to some or all of the configuration parameters indicated by the first information and the $M_i$ configuration parameters indicated by the $i^{th}$ piece of second information.

When i is not equal to 1, configuration information of the $i^{th}$ reference signal is related to configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 41: According to the method according to Embodiment 40, $Q_i$ is equal to N.

When i is equal to 1, the N configuration parameters in the first information and the $M_i$ configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

Embodiment 42: According to the method in Embodiment 40, the $M_i$ configuration parameters in the $Q_i$ configuration parameters are related to the $i^{th}$ piece of second information.

When i is equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

When i is not equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the $Q_{i-1}$ configuration parameters of the $(i-1)^{th}$ reference signal.

Embodiment 43: According to the method in Embodiment 42, the $i^{th}$ piece of second information includes the $M_i$ configuration parameters.

Embodiment 44: According to the method in Embodiment 42, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

Embodiment 45: According to the method in Embodiment 44, when i is equal to 1, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

When i is not equal to 1, a configuration parameter with the second parameter name that is of the $i^{th}$ reference signal is related to the offset of the configuration parameter with the second parameter name in the $i^{th}$ piece of second information and the configuration parameter with the second parameter name in the $Q_{i-1}$ configuration parameters of the $(i-1)^{th}$ reference signal.

Embodiment 46: According to the method in any one of Embodiment 40 to Embodiment 45, the first information is used to determine configuration information of a $(K+1)^{th}$ reference signal.

Embodiment 47: According to the method in Embodiment 46, the configuration information of the $(K+1)^{th}$ reference signal includes the N configuration parameters.

Embodiment 48: According to the method in any one of Embodiment 40 to Embodiment 47, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 49: According to the method in any one of Embodiment 40 to Embodiment 48, the first information includes the N configuration parameters.

Embodiment 50: According to the method in any one of Embodiment 40 to Embodiment 48, the first information includes identification information of reference configuration information, and the reference configuration information includes the N configuration parameters.

Embodiment 51: A communications method is provided. The method includes the following steps:

A terminal device receives broadcast information sent by a network device, where the broadcast information includes K pieces of identification information, the K pieces of identification information respectively correspond to configuration information of K reference signals, and K is an integer greater than or equal to 1.

The terminal device determines the configuration information of the K reference signals that respectively corresponds to the K pieces of identification information.

Embodiment 52: According to the method in Embodiment 51, that the terminal device determines the configuration information of the K reference signals that respectively corresponds to the K pieces of identification information includes:

The terminal device determines, based on a preset correspondence between identification information and configuration information of a reference signal, the configuration information of the K reference signals that respectively corresponds to the K pieces of identification information.

Embodiment 53: A communications method is provided. The method includes the following steps:

A network device generates broadcast information, where the broadcast information includes identification information of configuration information of all of K reference signals.

The network device sends the broadcast information through broadcast.

Embodiment 54: According to the method in Embodiment 53, there is a preset correspondence between configuration information of a reference signal and identification information.

Embodiment 55: A communications apparatus is provided. The apparatus includes:

a receiving module, configured to receive broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and a processing module, configured to determine configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 56: According to the apparatus in Embodiment 55, $Q_i$ is equal to a sum of N and $M_i$.

The processing module is specifically configured to: determine the N configuration parameters in the $Q_i$ configuration parameters based on the first information, and determine the remaining $M_i$ configuration parameters in the $Q_i$ configuration parameters based on the $i^{th}$ piece of second information.

Embodiment 57: According to the apparatus in Embodiment 56, the $i^{th}$ piece of second information includes the $M_i$ configuration parameters.

Embodiment 58: According to the apparatus in Embodiment 56 or Embodiment 57, the $Q_i$ configuration parameters include the N configuration parameters.

Embodiment 59: According to the apparatus in Embodiment 55, $Q_i$ is equal to N, and the N configuration parameters in the first information and the $M_i$ configuration parameters include configuration parameters with a same parameter name.

Embodiment 60: According to the apparatus in Embodiment 59, the processing module is specifically configured to:

determine the $M_i$ configuration parameters in the $Q_i$ configuration parameters based on the $i^{th}$ piece of second information; and determine a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters.

Embodiment 61: According to the apparatus in Embodiment 60, the $i^{th}$ piece of second information includes the $M_i$ configuration parameters.

Embodiment 62: According to the apparatus in Embodiment 60, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

Embodiment 63: According to the apparatus in Embodiment 62, the processing module is specifically configured to determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

Embodiment 64: According to the apparatus in any one of Embodiment 59 to Embodiment 63, the processing module is further configured to determine, by the terminal device, configuration information of a (K+1)th reference signal based on the first information.

Embodiment 65: According to the apparatus in Embodiment 64, the configuration information of the $(K+1)^{th}$ reference signal includes the N configuration parameters.

Embodiment 66: According to the apparatus in any one of Embodiment 59 to Embodiment 65, the first information includes identification information of reference configuration information, and the reference configuration information includes the N configuration parameters.

Embodiment 67: According to the apparatus in any one of Embodiment 55 to Embodiment 66, the first information includes the N configuration parameters.

Embodiment 68: According to the apparatus in any one of Embodiment 55 to Embodiment 66, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 69: A communications apparatus is provided. The method includes:
- a processing module, configured to generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and
- a sending module, configured to send the broadcast information through broadcast.

Configuration information of the $i^{th}$ reference signal is related to some or all of the configuration parameters indicated by the first information and the $M_i$ configuration parameters indicated by the $i^{th}$ piece of second information, and the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 70: According to the apparatus in Embodiment 69, $Q_i$ is equal to a sum of N and $M_i$.

The N configuration parameters in the $Q_i$ configuration parameters are related to the first information, and the remaining $M_i$ configuration parameters in the $Q_i$ configuration parameters are related to the i pieces of second information.

Embodiment 71: According to the apparatus in Embodiment 70, the $i^{th}$ piece of second information includes the $M_i$ configuration parameters.

Embodiment 72: According to the apparatus in Embodiment 70 or Embodiment 71, the $Q_i$ configuration parameters include the N configuration parameters.

Embodiment 73: According to the apparatus in Embodiment 69, $Q_i$ is equal to N, and the N configuration parameters in the first information and the $M_i$ configuration parameters include configuration parameters with a same parameter name.

Embodiment 74: According to the apparatus in Embodiment 73, the $M_i$ configuration parameters in the $Q_i$ configuration parameters are related to the $i^{th}$ piece of second information, and a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

Embodiment 75: According to the apparatus in Embodiment 74, the $i^{th}$ piece of second information includes the $M_i$ configuration parameters.

Embodiment 76: According to the apparatus in Embodiment 74, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

Embodiment 77: According to the apparatus in Embodiment 76, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

Embodiment 78: According to the apparatus in any one of Embodiment 73 to Embodiment 77, the first information is used to determine configuration information of a $(K+1)^{th}$ reference signal.

Embodiment 79: According to the apparatus in Embodiment 78, the configuration information of the $(K+1)^{th}$ reference signal includes the N configuration parameters.

Embodiment 80: According to the apparatus in any one of Embodiment 73 to Embodiment 79, the first information includes identification information of reference configuration information, and the reference configuration information includes the N configuration parameters.

Embodiment 81: According to the apparatus in any one of Embodiment 69 to Embodiment 80, the first information includes the N configuration parameters.

Embodiment 82: According to the apparatus in any one of Embodiment 69 to Embodiment 81, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 83: A communications apparatus is provided. The apparatus includes:
- a receiving module, configured to receive broadcast information sent by a network device, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and
- a processing module, configured to:
  when i is equal to 1, determine configuration information of the $i^{th}$ reference signal based on some or all of the configuration parameters indicated by the first information and the $M_i$ configuration parameters indicated by the $i^{th}$ piece of second information; or
  when i is not equal to 1, determine configuration information of the $i^{th}$ reference signal based on configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 84: According to the apparatus in Embodiment 83, $Q_i$ is equal to N.

When i is equal to 1, the N configuration parameters in the first information and the $M_i$, configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

Embodiment 85: According to the apparatus in Embodiment 83, the processing module is specifically configured to:

when i is equal to 1, determine the $M_i$ configuration parameters in the $Q_i$ configuration parameters based on the $i^{th}$ piece of second information; and determine a configuration parameter other than the $M_i$ configuration parameters in the $Q_i$ configuration parameters based on a configuration parameter other than a configuration parameter whose parameter name is the same as any of parameter names of the $M_i$ configuration parameters in the $N^{th}$ configuration parameter; or when i is not equal to 1, determine the $M_i$ configuration parameters in the $Q_i$ configuration parameters based on the $i^{th}$ piece of second information; and determine a configuration parameter other than the $M_i$ configuration parameters in the $Q_i$ configuration parameters based on a configuration parameter other than a configuration parameter whose parameter name is the same as any of parameter names of the $M_i$ configuration parameters in the $Q_{i-1}$ configuration parameters of the $(i-1)^{th}$ reference signal.

Embodiment 86: According to the apparatus in Embodiment 85, the $i^{th}$ piece of second information includes the $M_i$ configuration parameters.

Embodiment 87: According to the apparatus in Embodiment 85, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

Embodiment 88: According to the apparatus in Embodiment 87, the processing module is specifically configured to:

when i is equal to 1, determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters; or when i is not equal to 1, determine a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

Embodiment 89: According to the apparatus in any one of Embodiment 83 to Embodiment 88, the processing module is further configured to determine configuration information of a $(K+1)^{th}$ reference signal based on the first information.

Embodiment 90: According to the apparatus in Embodiment 89, the configuration information of the $(K+1)^{th}$ reference signal includes the N configuration parameters.

Embodiment 91: According to the apparatus in any one of Embodiment 83 to Embodiment 90, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 92: According to the apparatus in any one of Embodiment 83 to Embodiment 91, the first information includes the N configuration parameters.

Embodiment 93: According to the apparatus in any one of Embodiment 83 to Embodiment 91, the first information includes identification information of reference configuration information, and the reference configuration information includes the N configuration parameters.

Embodiment 94: A communications apparatus is provided. The apparatus includes:

a processing module, configured to generate broadcast information, where the broadcast information includes first information and a plurality of pieces of second information, the first information is used to indicate N configuration parameters, and an $i^{th}$ piece of second information is used to indicate $M_i$ configuration parameters of an $i^{th}$ reference signal; and a sending module, configured to send the broadcast information through broadcast.

When i is equal to 1, configuration information of the $i^{th}$ reference signal is related to some or all of the configuration parameters indicated by the first information and the $M_i$ configuration parameters indicated by the $i^{th}$ piece of second information.

When i is not equal to 1, configuration information of the $i^{th}$ reference signal is related to configuration information of an $(i-1)^{th}$ reference signal and the $M_i$ configuration parameters indicated by the $i^{th}$ piece of second information.

The configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 95: According to the apparatus in Embodiment 94, $Q_i$ is equal to N.

When i is equal to 1, the N configuration parameters in the first information and the $M_i$ configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

Embodiment 96: According to the apparatus in Embodiment 94, the $M_i$ configuration parameters in the $Q_i$ configuration parameters are related to the $i^{th}$ piece of second information.

When i is equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the N configuration parameters.

When i is not equal to 1, a configuration parameter other than the $M_i$ configuration parameters in the $Q_i$ configuration parameters is related to a configuration parameter other than a configuration parameter whose parameter name is the same as any of parameter names of the $M_i$ configuration parameters in the $Q_{i-1}$ configuration parameters of the $(i-1)^{th}$ reference signal.

Embodiment 97: According to the apparatus in Embodiment 96, the $i^{th}$ piece of second information includes the $M_i$ configuration parameters.

Embodiment 98: According to the apparatus in Embodiment 96, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

Embodiment 99: According to the apparatus in Embodiment 98, when i is equal to 1, a configuration parameter with the first parameter name that is of the $i^{th}$ reference signal is related to the offset of the configuration parameter with the first parameter name in the $i^{th}$ piece of second information and the configuration parameter with the first parameter name in the N configuration parameters.

When i is not equal to 1, a configuration parameter with the second parameter name that is of the $i^{th}$ reference signal is related to the offset of the configuration parameter with the second parameter name in the $i^{th}$ piece of second information and the configuration parameter with the second parameter name in the $Q_{i-1}$ configuration parameters of the $(i-1)^{th}$ reference signal.

Embodiment 100: According to the apparatus in any one of Embodiment 94 to Embodiment 99, the first information is used to determine configuration information of a $(K+1)^{th}$ reference signal.

Embodiment 101: According to the apparatus in Embodiment 100, the configuration information of the $(K+1)^{th}$ reference signal includes the N configuration parameters.

Embodiment 102: According to the apparatus in any one of Embodiment 94 to Embodiment 101, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 103: According to the apparatus in any one of Embodiment 94 to Embodiment 102, the first information includes the N configuration parameters.

Embodiment 104: According to the apparatus in any one of Embodiment 94 to Embodiment 102, the first information includes identification information of reference configuration information, and the reference configuration information includes the N configuration parameters.

Embodiment 105: A communications apparatus is provided. The apparatus includes:
a receiving module: configured to receive broadcast information sent by a network device, where the broadcast information includes K pieces of identification information, the K pieces of identification information respectively correspond to configuration information of K reference signals, and K is an integer greater than or equal to 1; and
a processing module, configured to determine the configuration information of the K reference signals that respectively corresponds to the K pieces of identification information.

Embodiment 106: According to the apparatus in Embodiment 105, the processing module is specifically configured to determine, based on a preset correspondence between identification information and configuration information of a reference signal, the configuration information of the K reference signals that respectively corresponds to the K pieces of identification information.

Embodiment 107: A communications apparatus is provided. The apparatus includes:
a processing module, configured to generate broadcast information, where the broadcast information includes identification information of configuration information of all of K reference signals; and
a sending module, configured to send the broadcast information through broadcast.

Embodiment 108: According to the apparatus in Embodiment 107, there is a preset correspondence between configuration information of a reference signal and identification information.

Embodiment 109: A communications system is provided. The system includes a terminal device and a network device.

The network device is configured to: generate broadcast information, and send the broadcast information through broadcast, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The terminal device is configured to: receive the broadcast information sent by the network device, and determine configuration information of the $i^{th}$ reference signal based on some or all of the configuration parameters indicated by the first information and the $M_i$ configuration parameters indicated by the $i^{th}$ piece of second information, where the configuration information of the $i^{th}$ reference signal includes $Q_i$ configuration parameters.

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 110: According to the system in Embodiment 109, $Q_i$ is equal to a sum of N and $M_i$.

The terminal device is specifically configured to: determine the N configuration parameters in the $Q_i$ configuration parameters based on the first information, and determine the remaining $M_i$ configuration parameters in the $Q_i$ configuration parameters based on the $i^{th}$ piece of second information.

Embodiment 111: According to the system in Embodiment 110, the $i^{th}$ piece of second information includes the $M_i$ configuration parameters.

Embodiment 112: According to the system in Embodiment 110 or Embodiment 111, the $Q_i$ configuration parameters include the N configuration parameters.

Embodiment 113: According to the system in Embodiment 109, $Q_i$ is equal to N, and the N configuration parameters in the first information and the $M_i$ configuration parameters include configuration parameters with a same parameter name.

Embodiment 114: According to the system in Embodiment 113, the terminal device is specifically configured to:
determine the $M_i$ configuration parameters in the $Q_i$ configuration parameters based on the $i^{th}$ piece of second information; and
determine a configuration parameter other than the $M_i$ configuration parameters in the $Q_i$ configuration parameters based on a configuration parameter other than a configuration parameter whose parameter name is the same as any of parameter names of the $M_i$ configuration parameters in the N configuration parameters.

Embodiment 115: According to the system in Embodiment 114, the $i^{th}$ piece of second information includes the $M_i$ configuration parameters.

Embodiment 116: According to the system in Embodiment 114, the $i^{th}$ piece of second information includes offsets of the $M_i$ configuration parameters, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

Embodiment 117: According to the system in Embodiment 116, the terminal device is specifically configured to:
determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters.

Embodiment 118: According to the system in any one of Embodiment 113 to Embodiment 117, the terminal device is further configured to determine configuration information of a $(K+1)^{th}$ reference signal based on the first information.

Embodiment 119: According to the system in Embodiment 118, the configuration information of the $(K+1)^{th}$ reference signal includes the N configuration parameters.

Embodiment 120: According to the system in any one of Embodiment 113 to Embodiment 119, the first information includes identification information of reference configuration information, and the reference configuration information includes the N configuration parameters.

Embodiment 121: According to the system in any one of Embodiment 114 to Embodiment 119, the first information includes the N configuration parameters.

Embodiment 122: According to the system in any one of Embodiment 109 to Embodiment 121, the N configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 123: A communications system is provided. The system includes a terminal device and a network device.

The network device is configured to: generate broadcast information, and send the broadcast information through broadcast, where the broadcast information includes first information and a plurality of pieces of second information, the first information is used to indicate N configuration parameters, and an $i^{th}$ piece of second information is used to indicate $M_i$ configuration parameters of an $i^{th}$ reference signal.

The terminal device is configured to: receive the broadcast information sent by the network device; and when i is equal to 1, determine configuration information of the $i^{th}$ reference signal based on some or all of the configuration parameters indicated by the first information and the $M_i$ configuration parameters indicated by the $i^{th}$ piece of second information; or when i is not equal to 1, determine configuration information of the $i^{th}$ reference signal based on configuration information of an $(i-1)^{th}$ reference signal and the $M_i$ configuration parameters indicated by the $i^{th}$ piece of second information, where the configuration information of the $i^{th}$ reference signal includes $Q_i$ configuration parameters;

N is an integer greater than or equal to 1, $M_i$ is an integer greater than or equal to 0, $Q_i$ is greater than or equal to N, $Q_i$ is greater than or equal to $M_i$, and i is an integer greater than or equal to 1.

Embodiment 124: According to the system in Embodiment 123, $Q_i$ is equal to N.

When i is equal to 1, the N configuration parameters in the first information and the $M_i$ configuration parameters include configuration parameters with a same parameter name.

When i is not equal to 1, $Q_{i-1}$ configuration parameters of the $(i-1)^{th}$ reference signal and the $M_i$ configuration parameters include configuration parameters with a same parameter name.

Embodiment 125: According to the system in Embodiment 123, the terminal device is specifically configured to:
determine the $M_i$ configuration parameters in the $Q_i$ configuration parameters based on the $i^{th}$ piece of second information; and
when i is equal to 1, determine a configuration parameter other than the $M_i$ configuration parameters in the $Q_i$ configuration parameters based on a configuration parameter other than a configuration parameter whose parameter name is the same as any of parameter names of the $M_i$ configuration parameters in the $N^{th}$ configuration parameter; or
when i is equal to 2, determine a configuration parameter other than the $M_i$ configuration parameters in the $Q_i$ configuration parameters based on a configuration parameter other than a configuration parameter whose parameter name is the same as any of parameter names of the $M_i$ configuration parameters in the $Q_{i-1}$ configuration parameters of the $(i-1)^{th}$ reference signal.

Embodiment 126: According to the system in Embodiment 125, the $i^{th}$ piece of second information includes the $M_i$ configuration parameters.

Embodiment 127: According to the system in Embodiment 125, the $i^{th}$ piece of second information includes offsets of the $M_i$ configuration parameters.

When i is equal to 1, an offset of a configuration parameter with a first parameter name in the $i^{th}$ piece of second information is an offset of a configuration parameter with the first parameter name in the $Q_i$ configuration parameters relative to a configuration parameter with the first parameter name in the N configuration parameters, and the first parameter name is any one of same parameter names of the N configuration parameters and the $M_i$ configuration parameters.

When i is not equal to 1, an offset of a configuration parameter with a second parameter name in the $i^{th}$ piece of second information is an offset of a configuration parameter with the second parameter name in the $Q_i$ configuration parameters relative to a configuration parameter with the second parameter name in the $Q_{i-1}$ configuration parameters of the $(i-1)^{th}$ reference signal, and the second parameter name is any one of same parameter names of configuration parameters in the $Q_{i-1}$ configuration parameters of the $(i-1)^{th}$ reference signal and the $M_i$ configuration parameters.

Embodiment 128: According to the system in Embodiment 127, when i is equal to 1, the terminal device is specifically configured to:
  when i is equal to 1, determine a configuration parameter with the first parameter name that is of the $i^{th}$ reference signal based on the offset of the configuration parameter with the first parameter name in the $i^{th}$ piece of second information and the configuration parameter with the first parameter name in the N configuration parameters; or
  when i is not equal to 1, determine a configuration parameter with the second parameter name that is of the $i^{th}$ reference signal based on the offset of the configuration parameter with the second parameter name in the $i^{th}$ piece of second information and the configuration parameter with the second parameter name in the $Q_{i-1}$ configuration parameters of the $(i-1)^{th}$ reference signal.

Embodiment 129: According to the system in any one of Embodiment 123 to Embodiment 128, the terminal device is further configured to determine configuration information of a $(K+1)^{th}$ reference signal based on the first information.

Embodiment 130: According to the system in Embodiment 129, the configuration information of the $(K+1)^{th}$ reference signal includes the N configuration parameters.

Embodiment 131: According to the system in any one of Embodiment 123 to Embodiment 130, the $M_i$ configuration parameters include one or more of the following: a periodicity, a slot offset, an occupied OFDM symbol location, a frequency domain RE offset, a quantity of ports, a CDM type, a frequency domain density, a scrambling ID, a mapped start RB, and a quantity of mapped RBs.

Embodiment 132: According to the system in any one of Embodiment 123 to Embodiment 131, the first information includes the N configuration parameters.

Embodiment 133: According to the system in any one of Embodiment 123 to Embodiment 131, the first information includes identification information of reference configuration information, and the reference configuration information includes the N configuration parameters.

Embodiment 134: A communications system is provided. The system includes a terminal device and a network device.

The network device is configured to: generate broadcast information, and send the broadcast information through broadcast, where the broadcast information includes identification information of configuration information of all of K reference signals, and K is an integer greater than or equal to 1.

The terminal device is configured to: receive the broadcast information sent by the network device, and determine the configuration information of the K reference signals that respectively corresponds to the K pieces of identification information.

Embodiment 135: According to the system in Embodiment 134, the terminal device is specifically configured to determine, based on a preset correspondence between identification information and configuration information of a reference signal, the configuration information of the K reference signals that respectively corresponds to the K pieces of identification information.

Embodiment 136: A communications apparatus is provided. The communications apparatus includes a memory and a processor, and the memory is coupled to the processor. The memory is configured to store program instructions. The processor is configured to invoke the program instructions in the memory to perform the communications method according to any one of Embodiment 1 to Embodiment 14.

In a possible implementation, the communications apparatus may further include a transceiver, and the processor is configured to control the transceiver to receive and send a signal.

Embodiment 137: A communications apparatus is provided. The communications apparatus includes a memory and a processor, and the memory is coupled to the processor. The memory is configured to store program instructions. The processor is configured to invoke the program instructions in the memory to perform the communications method according to any one of Embodiment 15 to Embodiment 28.

In a possible implementation, the communications apparatus may further include a transceiver, and the processor is configured to control the transceiver to receive and send a signal.

Embodiment 138: A communications apparatus is provided. The communications apparatus includes a memory and a processor, and the memory is coupled to the processor. The memory is configured to store program instructions. The processor is configured to invoke the program instructions in the memory to perform the communications method according to any one of Embodiment 29 to Embodiment 39.

In a possible implementation, the communications apparatus may further include a transceiver, and the processor is configured to control the transceiver to receive and send a signal.

Embodiment 139: A communications apparatus is provided. The communications apparatus includes a memory and a processor, and the memory is coupled to the processor. The memory is configured to store program instructions. The processor is configured to invoke the program instructions in the memory to perform the communications method according to any one of Embodiment 40 to Embodiment 50.

In a possible implementation, the communications apparatus may further include a transceiver, and the processor is configured to control the transceiver to receive and send a signal.

Embodiment 140: A communications apparatus is provided. The communications apparatus includes a memory and a processor, and the memory is coupled to the processor. The memory is configured to store program instructions. The processor is configured to invoke the program instructions in the memory to perform the communications method according to Embodiment 51 or Embodiment 52.

In a possible implementation, the communications apparatus may further include a transceiver, and the processor is configured to control the transceiver to receive and send a signal.

Embodiment 141: A communications apparatus is provided. The communications apparatus includes a memory and a processor, and the memory is coupled to the processor. The memory is configured to store program instructions. The processor is configured to invoke the program instructions in the memory to perform the communications method according to Embodiment 53 or Embodiment 54.

In a possible implementation, the communications apparatus may further include a transceiver, and the processor is configured to control the transceiver to receive and send a signal.

Embodiment 142: A chip or a chip system is provided. The chip or the chip system includes at least one processor and a communications interface, the communications interface and the at least one processor are interconnected through a line, and the at least one processor is configured to run a computer program or instructions, to perform the communications method according to any one of Embodiment 1 to Embodiment 14.

Embodiment 143: A chip or a chip system is provided. The chip or the chip system includes at least one processor and a communications interface, the communications interface and the at least one processor are interconnected through a line, and the at least one processor is configured to run a computer program or instructions, to perform the communications method according to any one of Embodiment 14 to Embodiment 28.

Embodiment 144: A chip or a chip system is provided. The chip or the chip system includes at least one processor and a communications interface, the communications interface and the at least one processor are interconnected through a line, and the at least one processor is configured to run a computer program or instructions, to perform the communications method according to any one of Embodiment 29 to Embodiment 39.

Embodiment 145: A chip or a chip system is provided. The chip or the chip system includes at least one processor and a communications interface, the communications interface and the at least one processor are interconnected through a line, and the at least one processor is configured to run a computer program or instructions, to perform the communications method according to any one of Embodiment 40 to Embodiment 50.

Embodiment 146: A chip or a chip system is provided. The chip or the chip system includes at least one processor and a communications interface, the communications interface and the at least one processor are interconnected through a line, and the at least one processor is configured to run a computer program or instructions, to perform the communications method according to Embodiment 51 to Embodiment 52.

Embodiment 147: A chip or a chip system is provided. The chip or the chip system includes at least one processor and a communications interface, the communications interface and the at least one processor are interconnected through a line, and the at least one processor is configured to run a computer program or instructions, to perform the communications method according to Embodiment 53 to Embodiment 54.

Embodiment 148: A computer-readable storage medium is provided, and is configured to store a computer program.

The computer program includes instructions used to perform the communications method according to any one of Embodiment 1 to Embodiment 14.

Embodiment 149: A computer-readable storage medium is provided, and is configured to store a computer program.

The computer program includes instructions used to perform the communications method according to any one of Embodiment 15 to Embodiment 28.

Embodiment 150: A computer-readable storage medium is provided, and is configured to store a computer program.

The computer program includes instructions used to perform the communications method according to any one of Embodiment 29 to Embodiment 39.

Embodiment 151: A computer-readable storage medium is provided, and is configured to store a computer program.

The computer program includes instructions used to perform the communications method according to any one of Embodiment 40 to Embodiment 50.

Embodiment 152: A computer-readable storage medium is provided, and is configured to store a computer program.

The computer program includes instructions used to perform the communications method according to Embodiment 51 or Embodiment 52.

Embodiment 153: A computer-readable storage medium is provided, and is configured to store a computer program.

The computer program includes instructions used to perform the communications method according to Embodiment 53 or Embodiment 54.

Embodiment 154: A computer program product is provided. The computer program product includes computer program code, and when the computer program code is run on a computer, the computer is enabled to perform the communications method according to any one of Embodiment 1 to Embodiment 14.

Embodiment 155: A computer program product is provided. The computer program product includes computer program code, and when the computer program code is run on a computer, the computer is enabled to perform the communications method according to any one of Embodiment 15 to Embodiment 28.

Embodiment 156: A computer program product is provided. The computer program product includes computer program code, and when the computer program code is run on a computer, the computer is enabled to perform the communications method according to any one of Embodiment 29 to Embodiment 39.

Embodiment 157: A computer program product is provided. The computer program product includes computer program code, and when the computer program code is run on a computer, the computer is enabled to perform the communications method according to any one of Embodiment 40 to Embodiment 50.

Embodiment 158: A computer program product is provided. The computer program product includes computer program code, and when the computer program code is run on a computer, the computer is enabled to perform the communications method according to Embodiment 51 or Embodiment 52.

Embodiment 159: A computer program product is provided. The computer program product includes computer program code, and when the computer program code is run on a computer, the computer is enabled to perform the communications method according to Embodiment 53 or Embodiment 54.

It should be noted that, in embodiments of this application, division into the modules is an example and is merely logical function division, and may be other division in an actual implementation. Functional modules in embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in a form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the method in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

All or some of the foregoing embodiments may be implemented by using software, hardware, firmware, or any combination thereof. When the software is used to implement embodiments, embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

What is claimed is:

1. A communications method, comprising:
receiving, by a terminal device or by a component in the terminal device, broadcast information sent by a network device, wherein the broadcast information comprises first information and a plurality of pieces of second information, the first information indicates N configuration parameters, and an $i^{th}$ piece of second information indicates $M_i$ configuration parameters of an $i^{th}$ reference signal; and
determining, by the terminal device or by the component in the terminal device, configuration information of the $i^{th}$ reference signal based on at least one of the configuration parameters indicated by the first information and the $M_i$ configuration parameters indicated by the $i^{th}$ piece of second information,
wherein:
the configuration information of the $i^{th}$ reference signal comprises $Q_i$ configuration parameters,
N is an integer greater than or equal to 1, $M_i$ is an integer greater than 0, $Q_i$ is greater than or equal to N, $Q_i$ is greater than or equal to $M_i$, and i is an integer greater than or equal to 1,
when the N configuration parameters comprise one or more of a periodicity, a slot offset, an occupied orthogonal frequency division multiplexing (OFDM) symbol location, a frequency domain resource element (RE) offset, a mapped start resource block (RB), and a quantity of mapped RBs,
the $M_i$ configuration parameters indicated by the $i^{th}$ piece of second information include a scrambling identity (ID), and
the $i^{th}$ reference signal is a tracking reference signal TRS.

2. The method according to claim 1, wherein $Q_i$ is equal to a sum of N and $M_i$; and
wherein the determining, by the terminal device or by the component in the terminal device, configuration information of the $i^{th}$ reference signal based on all of the configuration parameters indicated by the first information and the $M_i$ configuration parameters indicated by the $i^{th}$ piece of second information comprises:
determining, by the terminal device or by the component in the terminal device, the N configuration parameters in the $Q_i$ configuration parameters based on the first information; and
determining the remaining $M_i$ configuration parameters in the $Q_i$ configuration parameters based on the $i^{th}$ piece of second information.

3. The method according to claim 2, wherein the $i^{th}$ piece of second information comprises the $M_i$ configuration parameters, or the $Q_i$ configuration parameters comprise the N configuration parameters.

4. The method according to claim 1, wherein the N configuration parameters further comprise one or more of a quantity of ports, a code division multiplexing (CDM) type, a frequency domain density, and a scrambling ID.

5. The method according to claim 1, wherein the first information comprises the N configuration parameters.

6. A communications method, comprising:
generating, by a network device or by a component in the network device, broadcast information, wherein the broadcast information comprises first information and a plurality of pieces of second information, the first information indicates N configuration parameters, and an $i^{th}$ piece of second information indicates $M_i$ configuration parameters of an $i^{th}$ reference signal; and
sending, by the network device or by the component in the network device, the broadcast information through broadcast,
wherein:
configuration information of the $i^{th}$ reference signal is related to at least one of the configuration parameters indicated by the first information and the $M_i$ configuration parameters indicated by the $i^{th}$ piece of second information, and the configuration information of the $i^{th}$ reference signal comprises $Q_i$ configuration parameters,
N is an integer greater than or equal to 1, $M_i$ is an integer greater than 0, $Q_i$ is greater than or equal to N, $Q_i$ is greater than or equal to $M_i$, and i is an integer greater than or equal to 1, when the N configuration parameters comprise one or more of a periodicity, a slot offset, an occupied orthogonal frequency division multiplexing (OFDM) symbol location, a frequency domain resource element (RE) offset, a mapped start resource block (RB), and a quantity of mapped RBs, the $M_i$ configuration parameters indicated by the $i^{th}$ piece of second information include a scrambling identity (ID), and the $i^{th}$ reference signal is a tracking reference signal TRS.

7. The method according to claim 6, wherein $Q_i$ is equal to a sum of N and $M_i$; and wherein the N configuration parameters in the $Q_i$ configuration parameters are related to the first information, and the remaining $M_i$ configuration parameters in the $Q_i$ configuration parameters are related to the $i^{th}$ piece of second information.

8. The method according to claim 7, wherein the $i^{th}$ piece of second information comprises the $M_i$ configuration parameters, or the $Q_i$ configuration parameters comprise the N configuration parameters.

9. The method according to claim 6, wherein the N configuration parameters further comprise one or more of a quantity of ports, a code division multiplexing (CDM) type, a frequency domain density, and a scrambling ID.

10. The method according to claim 6, wherein the first information comprises the N configuration parameters.

11. A terminal device, comprising:
at least one processor;
a transceiver; and
a non-transitory computer-readable storage medium storing a program to be executed by the at least one processor, the program including instructions for:
receiving, through the transceiver, broadcast information sent by a network device, wherein the broadcast information comprises first information and a plurality of pieces of second information, the first information indicates N configuration parameters, and an ith piece of second information indicates Mi configuration parameters of an ith reference signal; and
determining configuration information of the ith reference signal based on at least one of the configuration parameters indicated by the first information and the Mi configuration parameters indicated by the ith piece of second information, wherein the configuration information of the ith reference signal comprises Qi configuration parameters, wherein N is an integer greater than or equal to 1, Mi is an integer greater than 0, Qi is greater than or equal to N, Qi is greater than or equal to M, and i is an integer greater than or equal to 1, when the N configuration parameters comprise one or more of a periodicity, a slot offset, an occupied orthogonal frequency division multiplexing (OFDM) symbol location, a frequency domain resource element (RE) offset, a mapped start resource block (RB), and a quantity of mapped RBs, the $M_i$ configuration parameters indicated by the $i^{th}$ piece of second information include a scrambling identity (ID), and the $i^{th}$ reference signal is a tracking reference signal TRS.

12. The terminal device according to claim 11, wherein Qi is equal to a sum of N and M; and wherein the instructions for determining configuration information of the ith reference signal based on all of the configuration parameters indicated by the first information and the Mi configuration parameters indicated by the ith piece of second information further comprise instructions for:
determining the N configuration parameters in the Qi configuration parameters based on the first information; and
determining the remaining Mi configuration parameters in the Qi configuration parameters based on the ith piece of second information.

13. The terminal device according to claim 12, wherein the ith piece of second information comprises the Mi configuration parameters i the O configuration parameters comprise the N configuration parameters.

14. The terminal device according to claim 11, wherein the N configuration parameters further comprise one or more of a quantity of ports, a code division multiplexing (CDM) type, a frequency domain density, and a scrambling ID.

15. The terminal device according to claim 11, wherein the first information comprises the N configuration parameters.

16. A network device, comprising:
at least one processor;
a transceiver; and
a non-transitory computer-readable storage medium storing a program to be executed by the at least one processor, the program including instructions for:
generating broadcast information, wherein the broadcast information comprises first information and a plurality of pieces of second information, the first information indicates N configuration parameters, and an ith piece of second information indicates Mi configuration parameters of an ith reference signal; and
sending, through the transceiver, the broadcast information through broadcast,
wherein:
configuration information of the ith reference signal is related to at least one of the configuration parameters indicated by the first information and the Mi configuration parameters indicated by the ith piece of second information, and the configuration information of the ith reference signal comprises Qi configuration parameters, N is an integer greater than or equal to 1, Mi is an integer greater than 0, Qi is greater than or equal to N, Qi is greater than or equal to Mi, and i is an integer greater than or equal to 1, when the N configuration parameters comprise one or more of a periodicity, a slot offset, an occupied orthogonal frequency division multiplexing (OFDM) symbol location, a frequency domain resource element (RE) offset, a mapped start resource block (RB), and a quantity of mapped RBs, the Mi configuration parameters indicated by the ith piece of second information include a scrambling identity (ID), and the ith reference signal is a tracking reference signal TRS.

17. The network device according to claim 16, wherein Qi is equal to a sum of N and Mi; and wherein the N configuration parameters in the Qi configuration parameters are related to the first information, and the remaining Mi configuration parameters in the Qi configuration parameters are related to the ith piece of second information.

18. The network device to claim 17, wherein the ith piece of second information comprises the Mi configuration parameters, or the Qi configuration parameters comprise the N configuration parameters.

19. The network device according to claim 16, wherein the N configuration parameters further comprise one or more of a quantity of ports, a code division multiplexing (CDM) type, a frequency domain density, and a scrambling ID.

20. The network device according to claim 16, wherein the first information comprises the N configuration parameters.

* * * * *